(12) United States Patent
Musha et al.

(10) Patent No.: US 11,538,494 B2
(45) Date of Patent: *Dec. 27, 2022

(54) MAGNETIC RECORDING AND REPRODUCING DEVICE

(71) Applicant: FUJIFILM Corporation, Tokyo (JP)

(72) Inventors: Atsushi Musha, Minami-ashigara (JP); So Matsuyama, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/155,536

(22) Filed: Jan. 22, 2021

(65) Prior Publication Data

US 2021/0233563 A1 Jul. 29, 2021

(30) Foreign Application Priority Data

Jan. 24, 2020 (JP) .............................. JP2020-010317

(51) Int. Cl.
*G11B 5/706* (2006.01)
*G11B 5/78* (2006.01)
(Continued)

(52) U.S. Cl.
CPC ...... *G11B 5/70678* (2013.01); *G11B 5/00826* (2013.01); *G11B 5/714* (2013.01); *G11B 5/7356* (2019.05)

(58) Field of Classification Search
CPC . G11B 5/00826; G11B 5/70678; G11B 5/714; G11B 5/7356; G11B 5/7085;
(Continued)

(56) References Cited

U.S. PATENT DOCUMENTS

| | | | |
|---|---|---|---|
| 5,370,917 | A | 12/1994 | Niitsuma et al. |
| 5,490,020 | A | 2/1996 | Albrecht et al. |

(Continued)

FOREIGN PATENT DOCUMENTS

| | | | |
|---|---|---|---|
| JP | 2005-092967 A | 4/2005 | |
| JP | 2008-140504 A | 6/2008 | |

(Continued)

OTHER PUBLICATIONS

Office Action dated Sep. 24, 2021 in U.S. Appl. No. 17/155,738.
(Continued)

*Primary Examiner* — Holly Rickman
*Assistant Examiner* — Lisa Chau
(74) *Attorney, Agent, or Firm* — Sughrue Mion, PLLC

(57) ABSTRACT

In the magnetic recording and reproducing device, a distal end width of the first magnetic pole in the recording element is substantially the same as a distal end width of the second magnetic pole; the reproducing element width of the reproducing element is equal to or less than 0.8 μm; and in the magnetic recording medium, a number distribution A of equivalent circle diameters of a plurality of bright areas in a binarized image of a secondary electron image obtained by imaging a surface of the magnetic layer with a scanning electron microscope at an acceleration voltage of 5 kV, and a number distribution B of equivalent circle diameters of a plurality of dark areas in a binarized image of a secondary electron image obtained by imaging the surface of the magnetic layer with a scanning electron microscope at an acceleration voltage of 2 kV satisfy predetermined number distribution, respectively.

11 Claims, 4 Drawing Sheets

(51) Int. Cl.
*G11B 5/735* (2006.01)
*G11B 5/714* (2006.01)
*G11B 5/008* (2006.01)

(58) Field of Classification Search
CPC ..... G11B 5/733; G11B 5/00813; G11B 5/735; G11B 5/70642; G11B 5/708; G11B 5/78; G11B 5/70615
See application file for complete search history.

(56) References Cited

U.S. PATENT DOCUMENTS

| | | | |
|---|---|---|---|
| 5,906,885 A * | 5/1999 | Yoshimura ............. | G11B 5/708 428/847.1 |
| 10,665,259 B1 | 5/2020 | Yamaga et al. | |
| 2007/0009768 A1 | 1/2007 | Takeda et al. | |
| 2007/0254190 A1 | 11/2007 | Brodd et al. | |
| 2008/0241600 A1 | 10/2008 | Tanaka et al. | |
| 2010/0143751 A1 | 6/2010 | Hsieh et al. | |
| 2011/0273797 A1 * | 11/2011 | Biskeborn ............ | G11B 5/3123 360/123.01 |
| 2015/0380037 A1 | 12/2015 | Tamada et al. | |
| 2016/0293196 A1 * | 10/2016 | Sato ........................ | G11B 5/714 |
| 2017/0092314 A1 * | 3/2017 | Mori ......................... | G11B 5/70 |
| 2018/0114541 A1 | 4/2018 | Nakashio et al. | |
| 2018/0182422 A1 * | 6/2018 | Kawakami .......... | G11B 5/70642 |
| 2018/0182428 A1 * | 6/2018 | Kasada .................. | G11B 5/708 |
| 2018/0286449 A1 | 10/2018 | Kasada et al. | |
| 2020/0118589 A1 | 4/2020 | Terakawa et al. | |
| 2021/0233561 A1 | 7/2021 | Kasada | |
| 2021/0233562 A1 | 7/2021 | Kasada | |
| 2021/0233564 A1 | 7/2021 | Kasada | |
| 2021/0233565 A1 | 7/2021 | Kasada et al. | |
| 2021/0233566 A1 | 7/2021 | Kasada | |
| 2021/0295868 A1 | 9/2021 | Kataguchi et al. | |
| 2022/0028420 A1 | 1/2022 | Kasada | |

FOREIGN PATENT DOCUMENTS

| | | | |
|---|---|---|---|
| JP | 2008140504 A | * | 6/2008 |
| JP | 2017-068884 A | | 4/2017 |
| JP | 6195872 B2 | | 9/2017 |
| JP | 2018-110045 A | | 7/2018 |
| JP | 2018-170058 A | | 11/2018 |

OTHER PUBLICATIONS

Notice of Allowance dated Oct. 8, 2021 in U.S. Appl. No. 17/155,777.
Notice of Allowance dated Nov. 1, 2021 in U.S. Appl. No. 17/155,695.
Office Action dated Dec. 7, 2021 in U.S. Appl. No. 17/154,002.
Notice of Allowance dated Dec. 21, 2021 in U.S. Appl. No. 17/155,540.
U.S. Appl. No. 17/490,008, filed Sep. 30, 2021 (Kasada).
Office Action dated Jun. 29, 2021 in U.S. Appl. No. 17/155,695.
Office Action dated Sep. 2, 2021 in U.S. Appl. No. 17/155,540.
Notice of Allowance dated Jul. 27, 2021 in U.S. Appl. No. 17/155,777.
Notice of Allowance dated Jun. 13, 2022 in U.S. Appl. No. 17/490,008.
Notice of Allowance dated Feb. 9, 2022 in U.S. Appl. No. 17/155,738.
Notice of Allowance dated Apr. 4, 2022 in U.S. Appl. No. 17/154,002.

* cited by examiner

MAGNETIC RECORDING AND REPRODUCING DEVICE

CROSS-REFERENCE TO RELATED APPLICATIONS

This application claims priority under 35 U.S.C 119 to Japanese Patent Application No. 2020-010317 filed on Jan. 24, 2020. The above application is hereby expressly incorporated by reference, in its entirety, into the present application.

BACKGROUND OF THE INVENTION

1. Field of the Invention

The present invention relates to a magnetic recording and reproducing device.

2. Description of the Related Art

Magnetic recording is one of methods for recording data on a recording medium (see, for example, JP2018-170058A).

SUMMARY OF THE INVENTION

In magnetic recording, data is recorded by magnetically writing data on a magnetic layer of a magnetic recording medium using a recording element. Reproduction of data is performed by magnetically reading the data recorded as described above using a reproducing element.

An increase in recording capacity (high capacity) of the magnetic recording medium is required in accordance with a great increase in information content in recent years. As means for realizing high capacity, a technology of increasing recording density of the data to be recorded on the magnetic recording medium is used. However, as the recording density increased, in a case where the data is reproduced by the reproducing element, a bit error rate tends to increase due to displacement of the reproducing element from a center of a recording track to be reproduced (off-track). In a case where a distance of the reproducing element displaced from the center of the recording track to be reproduced is referred to as an "off-track amount" and the off-track amount that can be reproduced at a low bit error rate is referred to as an "off-track margin", a larger value of the off-track margin is desirable from a viewpoint of improving reproduction quality in a case of reproducing high-density recorded data. The "off-track margin properties" described below implies that the larger the off-track margin, the better the properties.

In view of the above circumstances, an object of one embodiment of the present invention is to provide a new unit that enables data reproduction with excellent off-track margin properties.

According to one aspect of the invention, there is provided a magnetic recording and reproducing device comprising: a magnetic recording medium; a recording element; and a reproducing element; in which the recording element is an inductive recording element including a first magnetic pole which generates a magnetic field, and a second magnetic pole which is separated from the first magnetic pole with a write gap interposed therebetween, a distal end width of the first magnetic pole is substantially the same as a distal end width of the second magnetic pole, a reproducing element width of the reproducing element is equal to or less than 0.8 μm, the magnetic recording medium includes a non-magnetic support, and a magnetic layer including a ferromagnetic powder, a number distribution A of equivalent circle diameters of a plurality of bright areas in a binarized image of a secondary electron image obtained by imaging a surface of the magnetic layer with a scanning electron microscope at an acceleration voltage of 5 kV satisfies the followings (1) to (3): (1) the number of bright areas having an equivalent circle diameter of 1 nm to 50 nm is 1,000 to 30,000, (2) the number of bright areas having an equivalent circle diameter of 51 nm to 100 nm is 1,000 to 25,000, and (3) the number of bright areas having an equivalent circle diameter equal to or greater than 101 nm is 100 to 7,000, and a number distribution B of equivalent circle diameters of a plurality of dark areas in a binarized image of a secondary electron image obtained by imaging the surface of the magnetic layer with a scanning electron microscope at an acceleration voltage of 2 kV satisfies the followings (4) to (6): (4) the number of dark areas having an equivalent circle diameter of 1 nm to 50 nm is 10 to 25,000, (5) the number of dark areas having an equivalent circle diameter of 51 nm to 100 nm is 200 to 5,000, and (6) the number of dark areas having an equivalent circle diameter equal to or greater than 101 nm is 0 to 200.

In one embodiment, a total thickness of the magnetic recording medium may be equal to or less than 5.3 μm.

In one embodiment, the magnetic recording medium may further include a non-magnetic layer including a non-magnetic powder between the non-magnetic support and the magnetic layer.

In one embodiment, the magnetic recording medium may include a back coating layer including a non-magnetic powder on a surface of the non-magnetic support opposite to the surface provided with the magnetic layer.

In one embodiment, the magnetic layer may include two or more kinds of non-magnetic powders.

In one embodiment, the non-magnetic powder of the magnetic layer may include an alumina powder.

In one embodiment, the non-magnetic powder of the magnetic layer may include carbon black.

In one embodiment, the ferromagnetic powder may be a hexagonal barium ferrite powder.

In one embodiment, the ferromagnetic powder may be a hexagonal strontium barium ferrite powder.

In one embodiment, the ferromagnetic powder may be an s-iron oxide powder.

In one embodiment, the magnetic recording medium may be a magnetic tape.

According to one aspect of the present invention, it is possible to provide a magnetic recording and reproducing device capable of reproducing data with excellent off-track margin properties.

DESCRIPTION OF THE PREFERRED EMBODIMENTS

Figure 1:
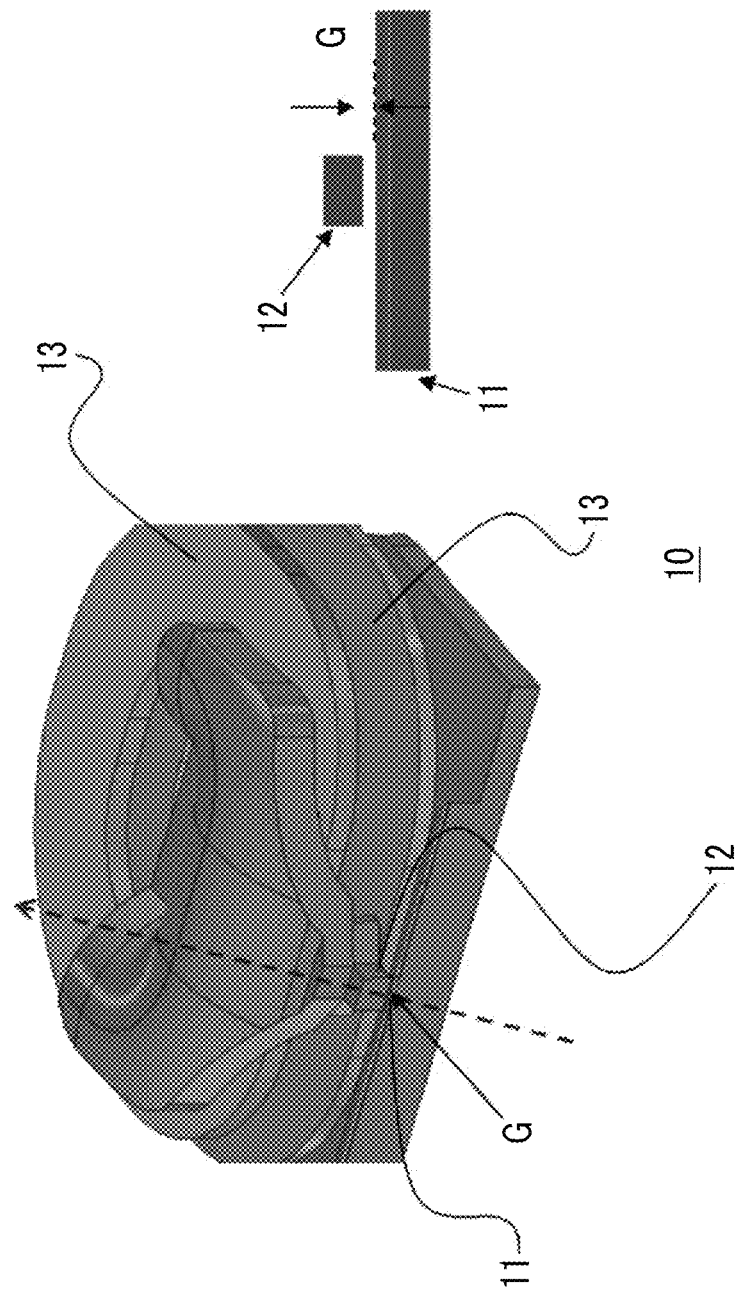
FIG. 1 is a partially enlarged view of an example of a recording element that is processed to make a distal end width of a first magnetic pole substantially equal to a distal end width of a second magnetic pole.

One aspect of the invention relates to a magnetic recording and reproducing device including a magnetic recording medium, a recording element, and a reproducing element.

Hereinafter, the magnetic recording and reproducing device will be described in detail.

Such a magnetic recording and reproducing device is generally referred to as a drive. The magnetic recording and reproducing device can be a sliding type magnetic recording and reproducing device. The sliding type magnetic recording and reproducing device is a device in which the surface of the magnetic layer and the magnetic head are in contact with each other and slide, in a case of performing recording of data on the magnetic recording medium and/or reproducing of the recorded data. The magnetic recording and reproducing device generally includes one or two or more magnetic heads including elements for data. Here, the "elements for data" are used as a general term for an element for recording data and an element for reproducing data. In the present invention and the present specification, the "recording element" refers to the element for recording data, and the "reproducing element" refers to the element for reproducing data. In addition, the magnetic recording and reproducing device can include a magnetic recording medium attachably and detachably.

Magnetic Head

In one aspect, the magnetic recording and reproducing device can include a recording element and a reproducing element in the same magnetic head. In another aspect, separate magnetic heads may include the recording element and the reproducing element, respectively. In addition, the magnetic head including the recording element and/or the reproducing element may include a servo signal reading element. Alternatively, as a magnetic head other than the magnetic head including the recording element and/or the reproducing element, a magnetic head (servo head) comprising a servo signal reading element may be included in the magnetic recording and reproducing device. For example, the magnetic head including the recording element and/or the reproducing element (hereinafter, also referred to as a "recording and reproducing head") can include two servo signal reading elements, and each of the two servo signal reading elements can read two adjacent servo bands at the same time. One or a plurality of elements for data can be disposed between the two servo signal reading elements. The number of each element included in the magnetic head and the arrangement of each element in the magnetic head can be determined according to the standard of the magnetic recording and reproducing device.

Recording Element

The magnetic recording and reproducing device includes an inductive recording element including a first magnetic pole which generates a magnetic field and a second magnetic pole which is separated from the first magnetic pole with a write gap interposed therebetween. The inductive recording element is generally referred to as an electromagnetic inductive recording element or a magnetic inductive recording element. In the inductive recording element, a current flows through a coil to generate a leakage magnetic field from a gap portion (write gap) of a head core, and this leakage magnetic field forms a magnetized area (that is, records data) on a magnetic layer of the magnetic recording medium. In the recording element included in the magnetic recording and reproducing device, the distal end width of the first magnetic pole is substantially the same as the distal end width of the second magnetic pole. On the other hand, in an inductive recording element mounted on the magnetic recording and reproducing device currently available on the market, the distal end width of the first magnetic pole is wider than the distal end width of the second magnetic pole. As compared with such an inductive recording element, in the inductive recording element in which the distal end width of the first magnetic pole is substantially the same as the distal end width of the second magnetic pole, the leakage magnetic field from the end of the magnetic pole is small. This makes it possible to reduce a distortion of a magnetization state at a recording track end, thereby increasing an effective recording track width. The present inventors have thought that this can contribute to obtaining excellent off-track margin properties.

Hereinafter, the recording element will be described in more detail with reference to the drawings. However, the embodiment shown in the drawings is an example, and the recording element included in the magnetic recording and reproducing device is not limited to the embodiment shown as an example.

FIG. 1 is a partially enlarged view of an example of a recording element that is processed to make a distal end width of a first magnetic pole substantially equal to a distal end width of a second magnetic pole. In FIG. 1, a more partially enlarged view of a left diagram is a right diagram. In the left diagram of FIG. 1, a dotted arrow indicates a running direction of the magnetic recording medium, in a case of recording data on the magnetic recording medium. A recording element 10 shown in FIG. 1 includes a first magnetic pole 11, a second magnetic pole 12, and a coil 13. The second magnetic pole 12 is separated from the first magnetic pole 11 with a write gap G interposed therebetween.

The first magnetic pole 11 is a magnetic pole generally referred to as a leading side magnetic pole and is a magnetic pole that generates a magnetic field. The magnetic field generated from the first magnetic pole leaks from the write gap as a leakage magnetic field, and the recording of data on the magnetic recording medium is performed by the leakage magnetic field.

Since a current flows through the coil 13, a magnetic flux can flow to the first magnetic pole 11 to generate a magnetic field.

The second magnetic pole 12 is a magnetic pole generally referred to as a trailing side magnetic pole and is a magnetic pole that closes a magnetic path with the magnetic recording medium.

Figure 2:
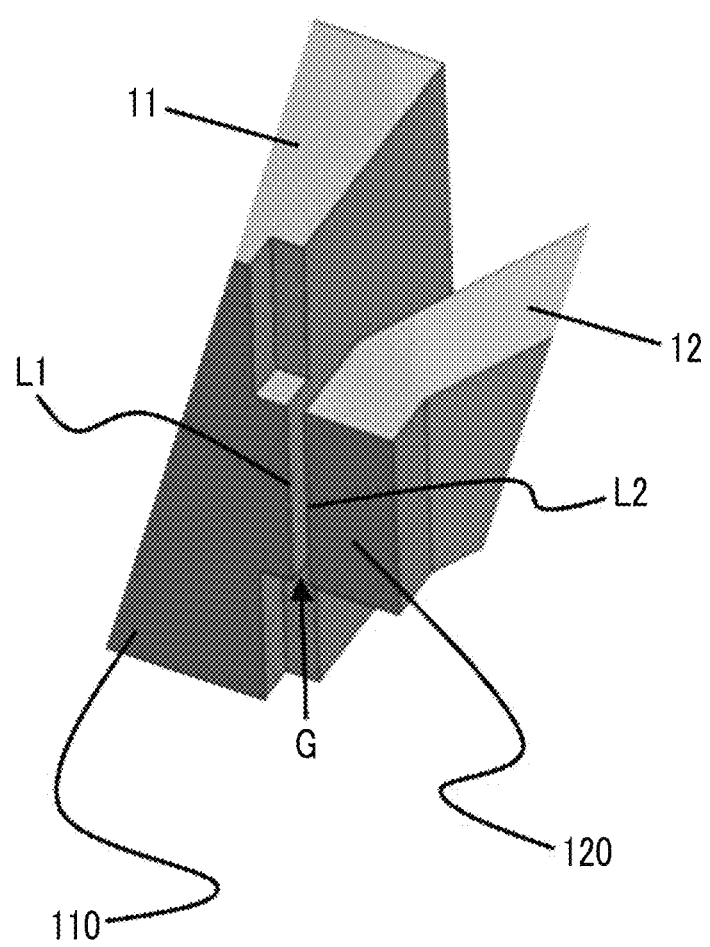
FIG. 2 is a schematic view showing a configuration of a write gap side distal end after the processing a recording element 10 shown in FIG. 1 to make the distal end width of the first magnetic pole substantially equal to the distal end width of the second magnetic pole.
Figure 3:
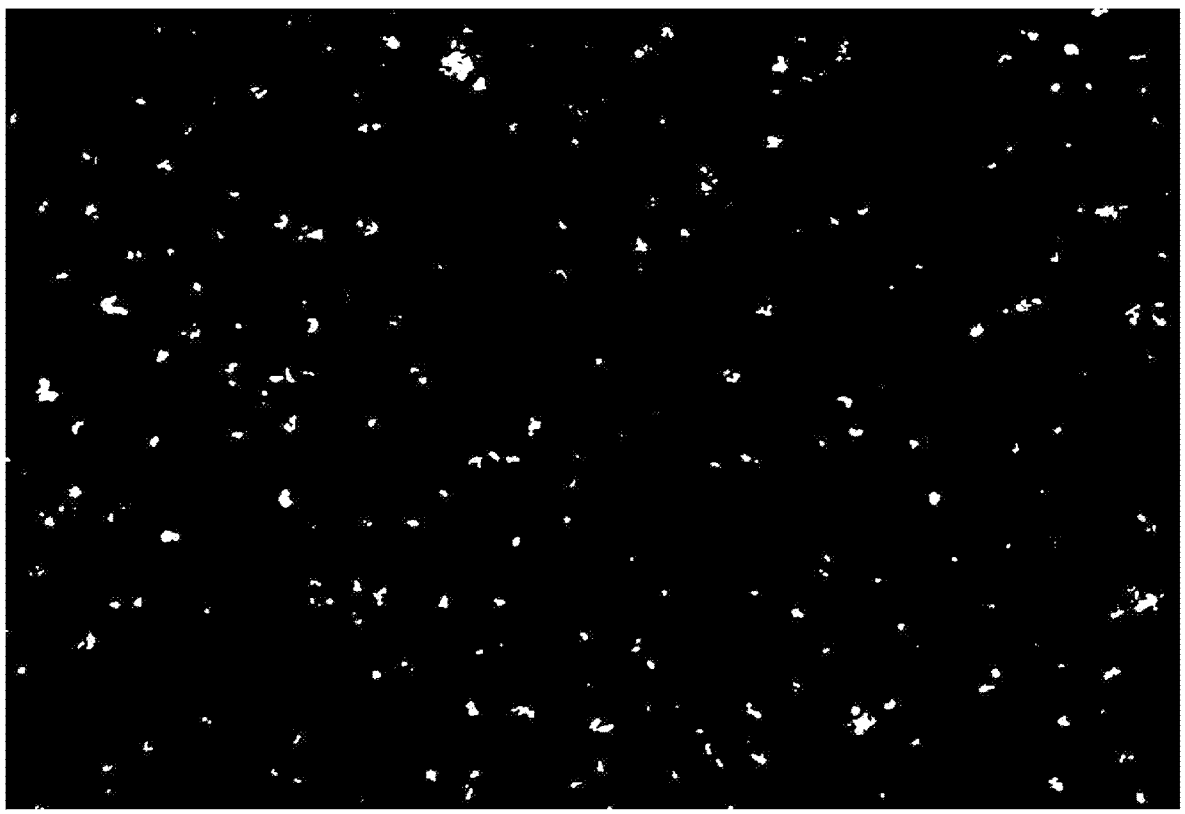
FIG. 3 shows an example of a binarized scanning electron microscope (SEM) image for the number distribution A.
Figure 4:
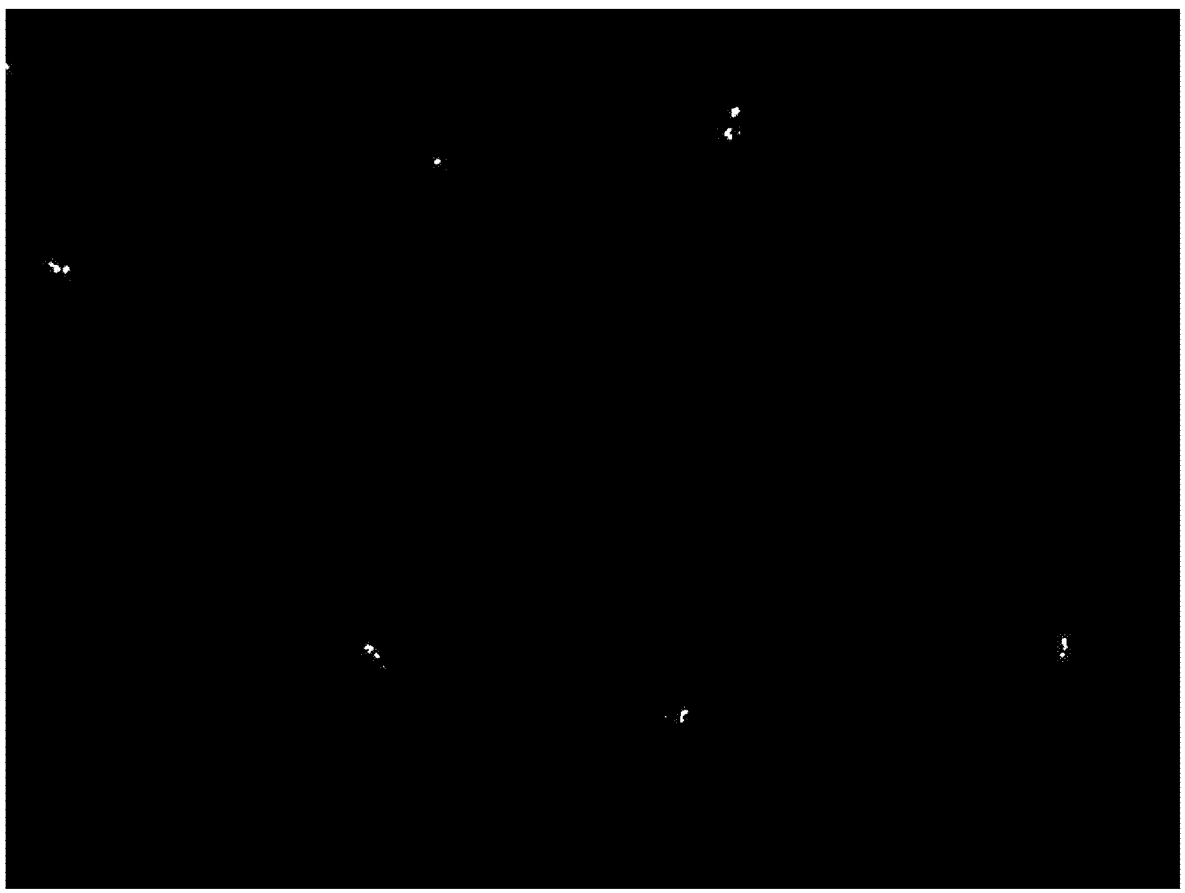
FIG. 4 shows an example of a binarized SEM image for the number distribution B.

FIG. 2 is a schematic view showing a configuration of a write gap side distal end after the processing the recording element 10 shown in FIG. 1 to make the distal end width of the first magnetic pole substantially equal to the distal end width of the second magnetic pole. The first magnetic pole 11 includes a surface 110 which is a sliding surface with respect to the magnetic recording medium in a case of recording data. The second magnetic pole 12 includes a surface 120 which is a sliding surface with respect to the magnetic recording medium in a case of recording data.

In the present invention and the present specification, the "distal end width" of the first magnetic pole refers to a write gap side endmost side of the surface of the first magnetic pole which is the sliding surface with respect to the magnetic recording medium in a case of recording data. In the example shown in FIG. 2, L1 is the write gap side endmost side. The "distal end width" of the second magnetic pole refers to a write gap side endmost side of the surface of the second magnetic pole which is the sliding surface with respect to the magnetic recording medium in a case of recording data. In the example shown in FIG. 2, L2 is the write gap side endmost side. In a case where the distal end width of the first magnetic pole is W1 and the distal end width of the second magnetic pole is W2, the expression that the distal end width of the first magnetic pole is "substantially the same" as the distal end width of the second magnetic pole means that W1 is in a range of "W2×0.9 to W2×1.1". The write gap side endmost side can be an endmost side of a squared end as in the example shown in FIG. 2, or can also be an endmost side of a rounded end obtained by performing, for example, chamfering or the like.

The recording element in which the distal end width of the first magnetic pole is substantially the same as the distal end width of the second magnetic pole can be manufactured by trimming the distal end of the first magnetic pole of an available recording element such as a recording element mounted on a commercially available magnetic recording and reproducing device or a recording element mounted on a commercially available magnetic head. Alternatively, the distal end width of the first magnetic pole can also be substantially the same as the distal end width of the second magnetic pole, by trimming the distal end of the first magnetic pole of the recording element manufactured by a well-known method. The trimming process can be performed by a well-known method using an ion beam or the like.

The recording element included in the magnetic recording and reproducing device can have the same configuration as a well-known inductive recording element, except the configuration described above. For the configuration of the well-known inductive recording element, for example, FIGS. 1 to 6, the description of these drawings, and the like of US2011/0273797A1 can be referred to.

Reproducing Element

The magnetic recording and reproducing device includes a reproducing element having a reproducing element width equal to or less than 0.8 μm. In the present invention and the present specification, the "reproducing element width" refers to a physical dimension of the reproducing element width. Such a physical dimension can be measured with an optical microscope, a scanning electron microscope, or the like. Since the reproducing element having a small reproducing element width does not easily protrude from a recording track to be reproduced, it can contribute to obtaining excellent off-track margin properties. From this point, the reproducing element width is equal to or less than 0.8 μm preferably equal to or less than 0.7 μm, and more preferably equal to or less than 0.6 μm. The reproducing element width can be, for example, equal to or greater than 0.1 μm. Alternatively, the reproducing element width may be less than 0.1 μm.

The reproducing element included in the magnetic recording and reproducing device can have a configuration of a well-known reproducing element, except that the reproducing element width is equal to or less than 0.8 μm. As the reproducing element, a magnetoresistive (MR) element capable of reading data recorded on the magnetic recording medium with excellent sensitivity is preferable. As the MR element, various well-known MR elements such as an Anisotropic Magnetoresistive (AMR) element, a Giant Magnetoresistive (GMR) element, or a Tunnel Magnetoresistive (TMR) element can be used.

Magnetic Recording Medium

The magnetic recording and reproducing device includes a magnetic recording medium including a non-magnetic support, and a magnetic layer including a ferromagnetic powder, in which a number distribution A of equivalent circle diameters of a plurality of bright areas in a binarized image of a secondary electron image obtained by imaging a surface of the magnetic layer with a scanning electron microscope at an acceleration voltage of 5 kV satisfies (1) to (3) described above, and a number distribution B of equivalent circle diameters of a plurality of dark areas in a binarized image of a secondary electron image obtained by imaging the surface of the magnetic layer with a scanning electron microscope at an acceleration voltage of 2 kV satisfies (4) to (6) described above.

A scanning electron microscope used for obtaining the number distribution A and the number distribution B in the present invention and the present specification, respectively, is a field emission-scanning electron microscope (FE-SEM). As the FE-SEM, for example, FE-SEM S4800 manufactured by Hitachi Ltd. can be used, and this FE-SEM was used in examples which will be described later.

In addition, in a case of obtaining the number distribution A and the number distribution B, respectively, a coating process on the surface of the magnetic layer is not performed before imaging an SEM image.

Each imaging is performed by selecting a non-imaging region on the surface of the magnetic layer.

The imaged SEM image is a secondary electron image.

The equivalent circle diameter is calculated in 1 nm increments by rounding off one digit after the decimal point and rounding off two digits after the decimal point.

In a case of obtaining the number distribution A, in the measurement of the number of bright areas, a bright area in which only a part is included in the binarized image and the remaining part is outside the binarized image is excluded from the measurement target.

In a case of obtaining the number distribution B, in the measurement of the number of dark areas, a dark area in which only a part is included in the binarized image and the remaining part is outside the binarized image is excluded from the measurement target.

In addition, in the invention and the specification, the "surface of the magnetic layer" is identical to the surface of the magnetic recording medium on the magnetic layer side.

Measurement Method of Number Distribution

Measurement Method of Number Distribution A

In the present invention and the present specification, the "number distribution A" is the number distribution measured by the following method.

A secondary electron image of the surface of the magnetic layer of the magnetic recording medium to be measured is imaged using a scanning electron microscope (FE-SEM). As imaging conditions, an acceleration voltage is set as 5 kV, a working distance is set as 5 mm, and an imaging magnification ratio is set as 10,000 times. At the time of imaging, a non-imaging region on the surface of the magnetic layer is selected, focus adjustment is performed under the above imaging conditions, and a secondary electron image is captured. A portion (micron bar, cross mark, or the like) for displaying a size and the like is removed from the captured image, and a secondary electron image having a pixel number of 960 pixels×1280 pixels is obtained.

The above operation is performed 100 times at different portions on the surface of the magnetic layer of the magnetic recording medium to be measured.

The secondary electron image obtained as described above is loaded into image processing software, and binarization processing is performed by the following procedure. As the image analysis software, for example, free software ImageJ can be used. By the binarization processing, the image is divided into a bright area (white portion) and a dark area (black portion).

A threshold value for binarizing the secondary electron image obtained above has a lower limit value of 210 gradations and an upper limit value of 255 gradations, and the binarization processing is executed with these two threshold values. After binarization processing, noise component removal processing is performed by image analysis software. The noise component removal process can be performed by the following method, for example. In the image analysis software ImageJ, the noise cut process Despeckle is selected to remove the noise component.

For the binarized image obtained as described above, the number of bright areas (that is, white portions) and the area of each bright area are obtained by image analysis software. From the area of the bright area obtained here, an equivalent circle diameter of each bright area is obtained. Specifically, an equivalent circle diameter L is calculated from the obtained area A by $(A/\pi)^{(1/2)} \times 2 = L$. Here, an operator "^" represents exponentiation.

The above steps are performed on the binarized images (100 images) obtained above. By doing so, the number distribution A is obtained.

Measurement Method of Number Distribution B

In the present invention and the present specification, the "number distribution B" is the number distribution measured by the following method. A secondary electron image of the surface of the magnetic layer of the magnetic recording medium to be measured is imaged using a scanning electron microscope (FE-SEM). As imaging conditions, an acceleration voltage is set as 2 kV, a working distance is set as 5 mm, and an imaging magnification ratio is set as 10,000 times. At the time of imaging, a non-imaging region on the surface of the magnetic layer is selected, focus adjustment is performed under the above imaging conditions, and a secondary electron image is captured. A portion (micron bar, cross mark, or the like) for displaying a size and the like is removed from the captured image, and a secondary electron image having a pixel number of 960 pixels×1280 pixels is obtained.

The above operation is performed 100 times at different portions on the surface of the magnetic layer of the magnetic recording medium to be measured.

The secondary electron image obtained as described above is loaded into image processing software, and binarization processing is performed by the following procedure. As the image analysis software, for example, free software ImageJ can be used.

A threshold value for binarizing the secondary electron image obtained above has a lower limit value of 0 gradations and an upper limit value of 75 gradations, and the binarization processing is executed with these two threshold values. After binarization processing, noise component removal processing is performed by image analysis software. The noise component removal process can be performed by the following method, for example. In the image analysis software ImageJ, the noise cut process Despeckle is selected to remove the noise component.

For the binarized image obtained as described above, the number of dark areas (that is, black portions) and the area of each dark area are obtained by image analysis software. From the area of the dark area obtained here, an equivalent circle diameter of each dark area is obtained. Specifically, an equivalent circle diameter L is calculated from the obtained area A by $(A/\pi)^{(1/2)} \times 2 = L$.

The above steps are performed on the binarized images (100 images) obtained above. By doing so, the number distribution B is obtained.

Number Distribution A and Number Distribution B

In the magnetic recording medium, the number distribution A obtained by the method described above satisfies the following (1) to (3).

(1) The number of bright areas having an equivalent circle diameter of 1 nm to 50 nm is 1,000 to 30,000.

(2) The number of bright areas having an equivalent circle diameter of 51 nm to 100 nm is 1,000 to 25,000, and (3) The number of bright areas having an equivalent circle diameter equal to or greater than 101 nm is 100 to 7,000, and In the magnetic recording medium, the number distribution B obtained by the method described above satisfies the following (4) to (6).

(4) The number of dark areas having an equivalent circle diameter of 1 nm to 50 nm is 10 to 25,000.

(5) The number of dark areas having an equivalent circle diameter of 51 nm to 100 nm is 200 to 5,000, and (6) The number of dark areas having an equivalent circle diameter equal to or greater than 101 nm is 0 to 200.

The magnetic layer is generally formed by using a magnetic layer forming composition including at least one kind of a non-magnetic powder, in addition to a ferromagnetic powder. The present inventors have thought that the number distribution A of the number distribution A and the number distribution B obtained by the method described above, can be an index of a presence state of a non-magnetic powder (hereinafter, also referred to as an "abrasive") included in the magnetic layer for imparting abrasiveness to the surface of the magnetic layer on the surface of the magnetic layer. In addition, the present inventors have thought that the number distribution B can be an index of a presence state of a non-magnetic powder (hereinafter, also referred to as a "filler") included in the magnetic layer for forming a suitable protrusion on the surface of the magnetic layer to control frictional properties on the surface of the magnetic layer. It is surmised that the presence of the non-magnetic powder which is a non-magnetic component so as to satisfy the number distribution A and the number distribution B described above, can contribute to the narrowing of a width of a magnetization transition region during recording of data on the magnetic recording medium. It is considered that this can contribute to improving the off-track margin properties. This is because the narrowing of the width of the magnetization transition region is considered to lead to a decrease in the bit error rate during the reproduction.

Regarding the (1) described above, the number of bright areas having an equivalent circle diameter of 1 nm to 50 nm is 1,000 to 30,000. From a viewpoint of cleaning properties, the number of the bright areas is preferably equal to or greater than 2,000 and more preferably equal to or greater than 3,000. In addition, from a viewpoint of surface properties, the number of the bright areas is preferably equal to or less than 28,000 and more preferably equal to or less than 25,000.

Regarding the (2) described above, the number of bright areas having an equivalent circle diameter of 51 nm to 100 nm is 1,000 to 25,000. From a viewpoint of cleaning properties, the number of the bright areas is preferably equal to or greater than 2,000 and more preferably equal to or greater than 3,000. In addition, from a viewpoint of surface properties, the number of the bright areas is preferably equal to or less than 23,000 and more preferably equal to or less than 20,000.

Regarding the (3) described above, the number of bright areas having an equivalent circle diameter equal to or greater than 101 nm is 100 to 7,000. From a viewpoint of cleaning properties, the number of the bright areas is preferably equal to or greater than 200 and more preferably equal to or greater than 300. In addition, from a viewpoint of surface properties, the number of the bright areas is preferably equal to or less than 6,800 and more preferably equal to or less than 6,500.

Regarding the (4) described above, the number of dark areas having an equivalent circle diameter of 1 nm to 50 nm is 10 to 25,000. From a viewpoint of frictional properties, the number of the dark areas is preferably equal to or greater than 50 and more preferably equal to or greater than 100. In addition, from a viewpoint of cleaning properties, the number of the dark areas is preferably equal to or less than 23,000 and more preferably equal to or less than 20,000.

Regarding the (5) described above, the number of dark areas having an equivalent circle diameter of 51 nm to 100 nm is 200 to 5,000. From a viewpoint of frictional properties, the number of the dark areas is preferably equal to or greater than 300 and more preferably equal to or greater than 400. In addition, from a viewpoint of cleaning properties, the number of the dark areas is preferably equal to or less than 4,800 and more preferably equal to or less than 4,500.

Regarding the (6) described above, the number of dark areas having an equivalent circle diameter equal to or greater than 101 nm is 0 to 200. From a viewpoint of frictional properties, the number of the dark areas is preferably equal to or greater than 10 and more preferably equal to or greater than 20. In addition, from a viewpoint of cleaning properties, the number of the dark areas is preferably equal to or less than 180 and more preferably equal to or less than 150.

The number distribution A and the number distribution B can be controlled by the kinds of components added to the magnetic layer forming composition used for forming the magnetic layer and a method for preparing such a composition (for example, dispersion method, classification method, or the like). For specific examples of the control method, the examples which will be described later can also be referred to.

Hereinafter, the magnetic recording medium will be further described in detail.

Magnetic Layer

Ferromagnetic Powder

As the ferromagnetic powder included in the magnetic layer, a well-known ferromagnetic powder can be used as one kind or in combination of two or more kinds as the ferromagnetic powder used in the magnetic layer of various magnetic recording media. It is preferable to use ferromagnetic powder having a small average particle size, from a viewpoint of improvement of recording density. From this viewpoint, an average particle size of the ferromagnetic powder is preferably 50 nm or less, more preferably 45 nm or less, even more preferably 40 nm or less, further more preferably 35 nm or less, and still preferably 30 nm or less, still more preferably 25 nm or less, and still even more preferably 20 nm or less. On the other hand, from a viewpoint of magnetization stability, the average particle size of the ferromagnetic powder is preferably 5 nm or more, more preferably 8 nm or more, even more preferably 10 nm or more, still preferably 15 nm or more, and still more preferably 20 nm or more.

Hexagonal Ferrite Powder

As a preferred specific example of the ferromagnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is a ferromagnetic powder in which a hexagonal ferrite type crystal structure is detected as a main phase by X-ray diffraction analysis. The main phase is a structure to which a diffraction peak at the highest intensity in an X-ray diffraction spectrum obtained by the X-ray diffraction analysis belongs. For example, in a case where the diffraction peak at the highest intensity in the X-ray diffraction spectrum obtained by the X-ray diffraction analysis belongs to a hexagonal ferrite type crystal structure, it is determined that the hexagonal ferrite type crystal structure is detected as a main phase. In a case where only a single structure is detected by the X-ray diffraction analysis, this detected structure is set as a main phase. The hexagonal ferrite type crystal structure includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which a main divalent metal atom included in this powder is a strontium atom, and the hexagonal barium ferrite powder is a powder in which a main divalent metal atom included in this powder is a barium atom. The main divalent metal atom is a divalent metal atom occupying the greatest content in the divalent metal atom included in the powder based on atom %. However, the divalent metal atom described above does not include rare earth atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one embodiment of the hexagonal ferrite powder will be described more specifically.

An activation volume of the hexagonal strontium ferrite powder is preferably 800 to 1600 $nm^3$. The atomized hexagonal strontium ferrite powder showing the activation volume in the range described above is suitable for manufacturing a magnetic recording medium exhibiting excellent electromagnetic conversion characteristics. The activation volume of the hexagonal strontium ferrite powder is preferably equal to or greater than 800 $nm^3$, and can also be, for example, equal to or greater than 850 nm. In addition, from a viewpoint of further improving the electromagnetic conversion characteristics, the activation volume of the hexagonal strontium ferrite powder is more preferably equal to or smaller than 1500 $nm^3$, even more preferably equal to or smaller than 1400 $nm^3$, still preferably equal to or smaller than 1300 $nm^3$, still more preferably equal to or smaller than 1200 $nm^3$, and still even more preferably equal to or smaller than 1100 nm$^3$. The same applies to the activation volume of the hexagonal barium ferrite powder.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values obtained from the following relational expression of He and an activation volume V. A unit of the anisotropy constant Ku is 1 erg/cc=1.0×10$^{-1}$ J/m$^3$.

$$Hc=2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×10 J/m$^3$, and more preferably have Ku equal to or greater than 2.0×10$^5$ J/m$^3$. In addition, Ku of the hexagonal strontium ferrite powder can be, for example, equal to or smaller than 2.5×10$^5$ J/m$^3$. However, the high Ku is preferable, because it means high thermal stability, and thus, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one embodiment, the hexagonal strontium ferrite powder including the rare earth atom can have rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content >1.0. The content of rare earth atom of the hexagonal strontium ferrite powder which will be described later is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content >1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the invention and the specification means a part of the region of the particles configuring the hexagonal strontium ferrite powder from the inside from the surface.

In a case where the hexagonal strontium ferrite powder includes the rare earth atom, a content (bulk content) of the rare earth atom is preferably 0.5 to 5.0 atom % with respect to 100 atom % of the iron atom. It is thought that the hexagonal strontium ferrite powder including the rare earth atom having the bulk content in the range described above and uneven distribution of the rare earth atom in the surface layer portion of the particles configuring the hexagonal strontium ferrite powder contribute to the prevention of reduction of reproduction output during the repeated reproduction. It is surmised that this is because the anisotropy constant Ku can be increased due to the hexagonal strontium ferrite powder including the rare earth atom having the bulk content in the range described above and uneven distribution of the rare earth atom in the surface layer portion of the particles configuring the hexagonal strontium ferrite powder. As the value of the anisotropy constant Ku is high, occurrence of a phenomenon, so-called thermal fluctuation can be prevented (that is, thermal stability can be improved). By preventing the occurrence of thermal fluctuation, it is possible to prevent reduction of the reproduction output during the repeated reproduction. It is surmised that, the uneven distribution of the rare earth atom in the particle surface layer portion of the hexagonal strontium ferrite powder contributes to stabilization of a spin at an iron (Fe) site in a crystal lattice of the surface layer portion, thereby increasing the anisotropy constant Ku.

It is surmised that the use of the hexagonal strontium ferrite powder having the rare earth atom surface layer portion uneven distribution as the ferromagnetic powder of the magnetic layer contributes to the prevention of chipping of the surface of the magnetic layer due to the sliding with the magnetic head. That is, it is surmised that the hexagonal strontium ferrite powder having the rare earth atom surface layer portion uneven distribution also contributes to the improvement of running durability of the magnetic recording medium. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of further preventing reduction of the reproduction output in the repeated reproduction and/or a viewpoint of further improving running durability, the content of rare earth atom (bulk content) is more preferably 0.5 to 4.5 atom %, even more preferably 1.0 to 4.5 atom %, and still preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of further preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion content/bulk content" greater than 1.0 means that the rare earth atom is unevenly distributed in the surface layer portion (that is, a larger amount of the rare earth atoms is present, compared to that inside), among the particles configuring the hexagonal strontium ferrite powder. In addition, the ratio of the surface layer portion content of the rare earth atom obtained by partial dissolving performed under the dissolving conditions which will be described later and the bulk content of the rare earth atom obtained by total dissolving performed under the dissolving conditions which will be described later. "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same lot. Meanwhile, regarding the hexagonal strontium ferrite powder included in a magnetic layer of a magnetic recording medium, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-091747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 mL of hydrochloric acid having a concentration of 1 mol/L is held on a hot plate at a set temperature of 70° C. for 1 hour. The obtained solution is filtered with a membrane filter having a hole diameter of 0.1 μm. The element analysis of the filtrate obtained as described above is performed by an inductively coupled plasma (ICP) analysis device. By doing so, the rare earth atom surface layer portion content with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 mL of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproducing output in a case of reproducing data recorded on a magnetic recording medium, it is desirable that the mass magnetization σs of ferromagnetic powder included in the magnetic recording medium is high. In regards to this point, in hexagonal strontium ferrite powder which includes the rare earth atom but does not have the rare earth atom surface layer portion uneven distribution, as tends to significantly decrease, compared to that in hexagonal strontium ferrite powder not including the rare earth atom. With respect to this, it is thought that the hexagonal strontium ferrite powder having the rare earth atom surface layer portion uneven distribution is preferable for preventing such a significant decrease in as. In one embodiment, σs of the hexagonal strontium ferrite powder can be equal to or greater than 45 A·m$^2$/kg and can also be equal to or greater than 47 A·m$^2$/kg. On the other hand, from a viewpoint of noise reduction, σs is preferably equal to or smaller than 80 A·m$^2$/kg and more preferably equal to or smaller than 60 A·m$^2$/kg, σs can be measured by using a well-known measurement device capable of measuring magnetic properties such as an oscillation sample type magnetic-flux meter. In the invention and the specification, the mass magnetization σs is a value measured at a magnetic field strength of 15 kOe, unless otherwise noted. 1 [kOe]=($10^6$/4π) [A/m]

Regarding the content (bulk content) of the constituting atom in the hexagonal strontium ferrite powder, a content of the strontium atom can be, for example, 2.0 to 15.0 atom % with respect to 100 atom % of the iron atom. In one embodiment, in the hexagonal strontium ferrite powder, the divalent metal atom included in this powder can be only a strontium atom. In another embodiment, the hexagonal strontium ferrite powder can also include one or more kinds of other divalent metal atoms, in addition to the strontium atom. For example, a barium atom and/or a calcium atom can be included. In a case where the other divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one embodiment, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can further include a rare earth atom. In addition, the hexagonal strontium ferrite powder may or may not include atoms other than these atoms. As an example the hexagonal strontium ferrite powder may include an aluminum atom (Al). A content of the aluminum atom can be, for example, 0.5 to 10.0 atom % with respect to 100 atom % of the iron atom. From a viewpoint of further preventing the reduction of the reproducing output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one embodiment, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one embodiment, the hexagonal strontium ferrite powder does not include a bismuth atom (Bi).

Metal Powder

As a preferred specific example of the ferromagnetic powder, ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be used. In the invention and the specification, the "ε-iron oxide powder" is a ferromagnetic powder in which an ε-iron oxide type crystal structure is detected as a main phase by X-ray diffraction analysis. For example, in a case where the diffraction peak at the highest intensity in the X-ray diffraction spectrum obtained by the X-ray diffraction analysis belongs to an ε-iron oxide type crystal structure, it is determined that the ε-iron oxide type crystal structure is detected as a main phase. As a producing method of the ε-iron oxide powder, a producing method from a goethite, and a reverse micelle method are known. All of the producing methods is well known. For example, for a method of producing the ε-iron oxide powder in which a part of Fe is substituted with a substitutional atom such as Ga, Co, Ti, Al, or Rh, a description disclosed in J. Jpn. Soc. Powder Metallurgy Vol. 61 Supplement, No. S1, pp. S280-S284, J. Mater. Chem. C, 2013, 1, pp. 5200-5206 can be referred to. However, the producing method of the ε-iron oxide powder which can be used as the ferromagnetic powder in the magnetic layer of the magnetic recording medium is not limited to the method described here.

The activation volume of the ε-iron oxide powder is preferably in a range of 300 to 1500 nm$^3$. The atomized ε-iron oxide powder showing the activation volume in the range described above is suitable for manufacturing a magnetic recording medium exhibiting excellent electromagnetic conversion characteristics. The activation volume of the ε-iron oxide powder is preferably equal to or greater than 300 nm$^3$, and can also be, for example, equal to or greater than 500 nm$^3$. In addition, from a viewpoint of further improving the electromagnetic conversion characteristics, the activation volume of the ε-iron oxide powder is more preferably equal to or smaller than 1400 nm$^3$, even more preferably equal to or smaller than 1300 nm$^3$, still preferably equal to or smaller than 1200 nm$^3$, and still more preferably equal to or smaller than 1100 nm$^3$.

The anisotropy constant Ku can be used as an index of reduction of thermal fluctuation, that is, improvement of thermal stability. The ε-iron oxide powder can preferably have Ku equal to or greater than $3.0 \times 10^4$ J/m$^3$, and more preferably have Ku equal to or greater than $8.0 \times 10^4$ J/m$^3$. In addition, Ku of the ε-iron oxide powder can be, for example, equal to or smaller than $3.0 \times 10^5$ J/m$^3$. However, the high Ku is preferable, because it means high thermal stability, and thus, Ku is not limited to the exemplified value.

From a viewpoint of increasing reproducing output in a case of reproducing data recorded on a magnetic recording medium, it is desirable that the mass magnetization σs of ferromagnetic powder included in the magnetic recording medium is high. In regard to this point, in one embodiment, σs of the ε-iron oxide powder can be equal to or greater than 8 A·m²/kg and can also be equal to or greater than 12 A·m²/kg. On the other hand, from a viewpoint of noise reduction, σs of the s-iron oxide powder is preferably equal to or smaller than 40 A·m²/kg and more preferably equal to or smaller than 35 A·m²/kg.

In the invention and the specification, average particle sizes of various powder such as the ferromagnetic powder and the like are values measured by the following method with a transmission electron microscope, unless otherwise noted.

The powder is imaged at an imaging magnification ratio of 100,000 with a transmission electron microscope, the image is printed on photographic printing paper so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle size of 500 particles obtained as described above is an average particle size of the powder. As the transmission electron microscope, a transmission electron microscope H-9000 manufactured by Hitachi. Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi. Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of a plurality of particles is not limited to an embodiment in which particles configuring the aggregate directly come into contact with each other, but also includes an embodiment in which a binding agent, an additive, or the like which will be described later is interposed between the particles. A term, particles may be used for representing the powder.

As a method of collecting a sample powder from the magnetic recording medium in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. A high filling percentage of the ferromagnetic powder in the magnetic layer is preferable from a viewpoint of improvement of recording density.

Binding Agent

The magnetic recording medium can be a coating type magnetic recording medium, and can include a binding agent in the magnetic layer. The binding agent is one or more kinds of resin. As the binding agent, various resins generally used as the binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. The resin may be a homopolymer or a copolymer. These resins can be used as the binding agent even in the non-magnetic layer and/or a back coating layer which will be described later.

For the binding agent described above, description disclosed in paragraphs 0028 to 0031 of JP2010-024113A can be referred to. An average molecular weight of the resin used as the binding agent can be, for example, 10,000 to 200,000 as a weight-average molecular weight. The amount of the binding agent used can be, for example, 1.0 to 30.0 parts by mass with respect to 100.0 parts by mass of the ferromagnetic powder.

Curing Agent

A curing agent can also be used together with the resin which can be used as the binding agent. As the curing agent, in one embodiment, a thermosetting compound which is a compound in which a curing reaction (crosslinking reaction) proceeds due to heating can be used, and in another embodiment, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Additives

The magnetic layer may include one or more kinds of additives, as necessary. As the additives, the curing agent described above is used as an example. In addition, examples of the additive included in the magnetic layer include a non-magnetic powder, a lubricant, a dispersing agent, a dispersing assistant, an antibacterial agent, an antistatic agent, and an antioxidant. In addition, for example, for the lubricant, a description disclosed in paragraphs 0030 to 0033, 0035, and 0036 of JP2016-126817A can be referred to. The non-magnetic layer which will be described later may include the lubricant. For the lubricant which may be included in the non-magnetic layer, a description disclosed in paragraphs 0030, 0031, 0034 to 0036 of JP2016-126817A can be referred to. For the dispersing agent, a description disclosed in paragraphs 0061 and 0071 of JP2012-133837A can be referred to.

As the dispersing agent which can be added to the magnetic layer forming composition, a well-known dispersing agent for increasing dispersibility of a ferromagnetic powder in a carboxy group-containing compound, a nitrogen-containing compound, or the like can also be used. For example, the nitrogen-containing compound may be any of primary amine represented by $NH_2R$, secondary amine represented by $NHR_2$, and tertiary amine represented by $NR_3$. As described above, R indicates any structure configuring the nitrogen-containing compound and a plurality of R may be the same as each other or different from each other. The nitrogen-containing compound may be a compound (polymer) having a plurality of repeating structures in a molecule. It is thought that a nitrogen-containing portion of the nitrogen-containing compound functioning as an adsorption portion to the surface of the particles of the ferromagnetic powder is a reason for the nitrogen-containing compound to function as the dispersing agent. As the carboxy group-containing compound, for example, fatty acid of oleic acid can be used. Regarding the carboxy group-containing compound, it is thought that a carboxy group functioning as an adsorption portion to the surface of the particles of the ferromagnetic powder is a reason for the carboxy group-containing compound to function as the dispersing agent. It is also preferable to use the carboxy group-containing compound and the nitrogen-containing compound in combination. The amount of these dispersing agent used can be set appropriately.

The dispersing agent may be added to a non-magnetic layer forming composition. For the dispersing agent which may be added to the non-magnetic layer forming composition, a description disclosed in a paragraph 0061 of JP2012-133837A can be referred to.

Abrasive

As described above, it is considered that the number distribution A can be an index of the presence state of the abrasive on the surface of the magnetic layer. Accordingly, the number distribution A can be controlled by the kind of the non-magnetic powder added as an abrasive. The abrasive is preferably a non-magnetic powder having Mohs hardness exceeding 8 and more preferably a non-magnetic powder having Mohs hardness equal to or greater than 9. A maximum value of Mohs hardness is 10. The abrasive can be a powder of an inorganic material and can also be a powder of an organic material. The abrasive can be a powder of an inorganic or organic oxide or a powder of a carbide. Examples of the carbide include a boron carbide (for example, $B_4C$), a titanium carbide (for example, TiC), and the like. In addition, diamond can also be used as the abrasive. In one embodiment, the abrasive is preferably a powder of an inorganic oxide. Specifically, examples of the inorganic oxide include alumina (for example, $Al_2O_3$), a titanium oxide (for example, $TiO_2$), a cerium oxide (for example, $CeO_2$), a zirconium oxide (for example, $ZrO_2$), and the like, and alumina is preferable among these. The Mohs hardness of alumina is approximately 9. For details of the alumina powder, description disclosed in paragraph 0021 of JP2013-229090A can also be referred to. In addition, a specific surface area can be used as an index of a particle size of the abrasive. It is thought that, as the specific surface area is large, the particle size of primary particles of the particles configuring the abrasive is small. As the abrasive, it is preferable to use an abrasive having a specific surface area measured by a Brunauer-Emmett-Teller (BET) method (hereinafter referred to as a "BET specific surface area") equal to or greater than 14 $m^2/g$. In addition, from a viewpoint of dispersibility, it is preferable to use an abrasive having a BET specific surface area equal to or less than 40 $m^2/g$. A content of the abrasive in the magnetic layer is preferably 1.0 to 30.0 parts by mass and more preferably 1.0 to 25.0 parts by mass with respect to 100.0 parts by mass of the ferromagnetic powder. As the abrasive, only one kind of non-magnetic powder can be used or two or more kinds of non-magnetic powders having different compositions and/or physical properties (for example, size) can also be used. In a case of using two or more kinds of non-magnetic powders as the abrasive, the content of the abrasive is a total content of the two or more kinds of non-magnetic powders. The same also applies to contents of various components of the invention and the specification. The abrasive is preferably subjected to a dispersion process (separate dispersion) separately from the ferromagnetic powder, and more preferably subjected to a dispersion process (separate dispersion) separately from the filler which will be described later. In a case of preparing the magnetic layer forming composition, the preparation of two or more kinds of dispersion liquids having different components and/or dispersion conditions as a dispersion liquid of the abrasive (hereinafter, also referred to as an "abrasive solution") is preferable for controlling the number distribution A.

A dispersing agent can also be used to adjust a dispersion state of the dispersion liquid of the abrasive. As a compound that can function as a dispersing agent for increasing the dispersibility of the abrasive, an aromatic hydrocarbon compound having a phenolic hydroxy group can be used. The "phenolic hydroxy group" refers to a hydroxy group directly bonded to an aromatic ring. The aromatic ring contained in the aromatic hydrocarbon compound may be a monocyclic ring, a polycyclic structure, or a fused ring. From a viewpoint of improving the dispersibility of the abrasive, an aromatic hydrocarbon compound containing a benzene ring or a naphthalene ring is preferable. In addition, the aromatic hydrocarbon compound may have a substituent other than the phenolic hydroxy group. Examples of the substituent other than the phenolic hydroxy group include a halogen atom, an alkyl group, an alkoxy group, an amino group, an acyl group, a nitro group, a nitroso group, and a hydroxyalkyl group, and a halogen atom, an alkyl group, an alkoxy group, an amino group, and a hydroxyalkyl group are preferable. The number of phenolic hydroxy groups contained in one molecule of the aromatic hydrocarbon compound may be one, two, three, or more.

As one preferable embodiment of the aromatic hydrocarbon compound having a phenolic hydroxy group, a compound represented by Formula 100 can be used.

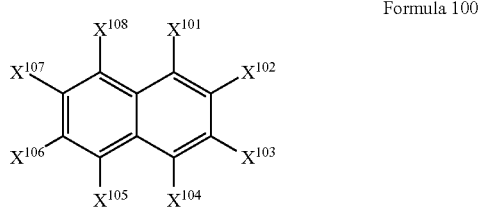

Formula 100

[In Formula 100, two of $X^{101}$ to $X^{108}$ are hydroxy groups, and the other six components each independently represent a hydrogen atom or a substituent.]

In the compound represented by Formula 100, the substitution positions of two hydroxy groups (phenolic hydroxy groups) are not particularly limited.

In the compound represented by Formula 100, two of $X^{101}$ to $X^{108}$ are hydroxy groups (phenolic hydroxy groups), and the other six components are each independently represent a hydrogen atom or a substituent. In addition, among $X^{101}$ to $X^{108}$, all of the moieties other than the two hydroxy groups may be hydrogen atoms, or some or all of them may be substituents. Examples of the substituent include the substituents described above. As a substituent other than the two hydroxy groups, one or more phenolic hydroxy groups may be included. From a viewpoint of improving the dispersibility of the abrasive, it is preferable that the components other than the two hydroxy groups of $X^{101}$ to $X^{108}$ are not phenolic hydroxy groups. That is, the compound represented by Formula 100 is preferably dihydroxynaphthalene or a derivative thereof, and more preferably 2,3-dihydroxynaphthalene or a derivative thereof. Examples of preferred substituents represented by $X^{101}$ to $X^{108}$ include a halogen atom (for example, a chlorine atom or a bromine atom), an amino group, an alkyl group having 1 to 6 (preferably 1 to 4) carbon atoms, and a methoxy group, and an ethoxy group, an acyl group, a nitro group, a nitroso group, and —$CH_2OH$ group.

In addition, for the dispersing agent for improving the dispersibility of the abrasive, description disclosed in paragraphs 0024 to 0028 of JP2014-179149A can also be referred to.

The dispersing agent for increasing the dispersibility of the abrasive can be used, for example, in a case of preparing the abrasive solution (for each abrasive solution in a case of preparing a plurality of abrasive solutions), in a proportion of 0.5 to 20.0 parts by mass and is preferably used in a proportion of 1.0 to 10.0 parts by mass with respect to 100.0 parts by mass of the abrasive.

Filler

As described above, it is thought that the number distribution B can be an index of a presence state of a non-magnetic powder (filler) included in the magnetic layer for forming a suitable protrusion on the surface of the magnetic layer to control frictional properties on the surface of the magnetic layer. Accordingly, the number distribution B can be controlled by the kind of the non-magnetic powder added as the filler. As one embodiment of the filler, carbon black can be used. A BET specific surface area of carbon black is preferably equal to or greater than 10 $m^2/g$ and more preferably equal to or greater than 15 $m^2/g$. The BET specific surface area of carbon black is preferably equal to or less than 50 $m^2/g$ and more preferably equal to or less than 40 $m^2/g$, from a viewpoint of ease of improving dispersibility. In addition, as the other embodiment of the filler, colloidal particles can be used. As the colloidal particles, inorganic colloidal particles are preferable, inorganic oxide colloidal particles are more preferable, and silica colloidal particles (colloidal silica) are even more preferred, from a viewpoint of availability. In the present invention and the present specification, the "colloidal particles" are particles which are not precipitated but dispersed to generate a colloidal dispersion, in a case where 1 g of the particles is added to 100 mL of at least one organic solvent of methyl ethyl ketone, cyclohexanone, toluene, or ethyl acetate, or a mixed solvent including two or more kinds of the solvent described above at any mixing ratio. An average particle size of the colloidal particles can be, for example, 30 to 300 nm and is preferably 40 to 200 nm. A content of the filler in the magnetic layer is preferably 0.5 to 10.0 parts by mass and more preferably 0.5 to 8.0 parts by mass with respect to 100.0 parts by mass of the ferromagnetic powder. The filler is preferably subjected to a dispersion process separately from the ferromagnetic powder, and more preferably subjected to a dispersion process separately from the abrasive. In a case of preparing the magnetic layer forming composition, the preparation of two or more kinds of dispersion liquids having different components and/or dispersion conditions as a dispersion liquid of the filler (hereinafter, also referred to as an "filler liquid") is preferable for controlling the number distribution A.

From a viewpoint of improving the dispersibility of carbon black, in one embodiment, a compound having an ammonium salt structure of an alkyl ester anion represented by Formula 1 can be used in a case of preparing the filler liquid. The "alkyl ester anion" can also be referred to as an "alkyl carboxylate anion".

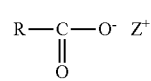

Formula 1

In Formula 1, R represents an alkyl group having 7 or more carbon atoms or a fluorinated alkyl group having 7 or more carbon atoms, and $Z^+$ represents an ammonium cation.

In addition, from a viewpoint of improving the dispersibility of carbon black, in one embodiment, two or more kinds of components capable of forming the compound having a salt structure can be used in a case of preparing the filler liquid. Accordingly, in a case of preparing the filler liquid, at least some of these components can form the compound having the salt structure.

Unless otherwise noted, groups described below may have a substituent or may be unsubstituted. In addition, the "number of carbon atoms" of a group having a substituent means the number of carbon atoms not including the number of carbon atoms of the substituent, unless otherwise noted. In the present invention and the specification, examples of the substituent include an alkyl group (for example, an alkyl group having 1 to 6 carbon atoms), a hydroxy group, an alkoxy group (for example, an alkoxy group having 1 to 6 carbon atoms), a halogen atom (for example, a fluorine atom, a chlorine atom, a bromine atom, or the like), a cyano group, an amino group, a nitro group, an acyl group, a carboxy group, salt of a carboxy group, a sulfonic acid group, and salt of a sulfonic acid group.

Hereinafter, Formula 1 will be described in more detail.

In Formula 1, R represents an alkyl group having 7 or more carbon atoms or a fluorinated alkyl group having 7 or more carbon atoms. The fluorinated alkyl group has a structure in which some or all of the hydrogen atoms constituting the alkyl group are substituted with a fluorine atom. The alkyl group or fluorinated alkyl group represented by R may have a linear structure, a branched structure, may be a cyclic alkyl group or fluorinated alkyl group, and preferably has a linear structure. The alkyl group or fluorinated alkyl group represented by R may have a substituent, may be unsubstituted, and is preferably unsubstituted. The alkyl group represented by R can be represented by, for example, $C_nH_{2n+1}-$. Here, n represents an integer of 7 or more. In addition, the fluorinated alkyl group represented by R may have a structure in which a part or all of the hydrogen atoms constituting the alkyl group represented by $C_nH_{2n+1}-$ are substituted with a fluorine atom. The alkyl group or fluorinated alkyl group represented by R has 7 or more carbon atoms, preferably 8 or more carbon atoms, more preferably 9 or more carbon atoms, further preferably 10 or more carbon atoms, still preferably 11 or more carbon atoms, still more preferably 12 or more carbon atoms, and still even more preferably 13 or more carbon atoms. The alkyl group or fluorinated alkyl group represented by R has preferably 20 or less carbon atoms, more preferably 19 or less carbon atoms, and even more preferably 18 or less carbon atoms.

In Formula 1, $Z^+$ represents an ammonium cation. Specifically, the ammonium cation has the following structure. In the present invention and the present specification, "*" in the formulas that represent a part of the compound represents a bonding position between the structure of the part and the adjacent atom.

The nitrogen cation $N^+$ of the ammonium cation and the oxygen anion $O^-$ in Formula 1 may form a salt bridging group to form the ammonium salt structure of the alkyl ester anion represented by Formula 1. The fact that the compound having the ammonium salt structure of the alkyl ester anion represented by Formula 1 is contained in the magnetic layer can be confirmed by performing analysis with respect to the magnetic recording medium by X-ray photoelectron spectroscopy (ESCA; Electron Spectroscopy for Chemical Analysis), infrared spectroscopy (IR), or the like.

In the one embodiment, the ammonium cation represented by $Z^+$ can be provided by, for example, the nitrogen atom of the nitrogen-containing polymer becoming a cation. The nitrogen-containing polymer means a polymer containing a nitrogen atom. In the present invention and the present specification, a term "polymer" means to include both a homopolymer and a copolymer. The nitrogen atom can be included as an atom configuring a main chain of the polymer in one embodiment, and can be included as an atom constituting a side chain of the polymer in one embodiment.

As one embodiment of the nitrogen-containing polymer, polyalkyleneimine can be used. The polyalkyleneimine is a ring-opening polymer of alkyleneimine and is a polymer having a plurality of repeating units represented by Formula 2.

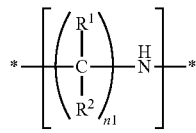

Formula 2

The nitrogen atom N configuring the main chain in Formula 2 can be converted to a nitrogen cation $N^+$ to provide an ammonium cation represented by $Z^+$ in Formula 1. Then, an ammonium salt structure can be formed with the alkyl ester anion, for example, as follows.

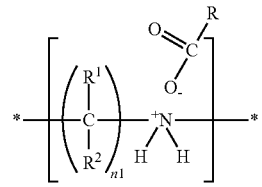

Hereinafter, Formula 2 will be described in more detail.

In Formula 2, $R^1$ and $R^2$ each independently represent a hydrogen atom or an alkyl group, and n1 represents an integer of 2 or more.

Examples of the alkyl group represented by $R^1$ or $R^2$ include an alkyl group having 1 to 6 carbon atoms, preferably an alkyl group having 1 to 3 carbon atoms, more preferably a methyl group or an ethyl group, and even more preferably a methyl group. The alkyl group represented by $R^1$ or $R^2$ is preferably an unsubstituted alkyl group. A combination of $R^1$ and $R^2$ in Formula 2 is a form in which one is a hydrogen atom and the other is an alkyl group, a form in which both are hydrogen atoms, and a form in which both are an alkyl group (the same or different alkyl groups), and is preferably a form in which both are hydrogen atoms. As the alkyleneimine that provides the polyalkyleneimine, a structure of the ring that has the smallest number of carbon atoms is ethyleneimine, and the main chain of the alkyleneimine (ethyleneimine) obtained by ring opening of ethyleneimine has 2 carbon atoms. Accordingly, n1 in Formula 2 is 2 or more. n1 in Formula 2 can be, for example, 10 or less, 8 or less, 6 or less, or 4 or less. The polyalkyleneimine may be a homopolymer containing only the same structure as the repeating structure represented by Formula 2, or may be a copolymer containing two or more different structures as the repeating structure represented by Formula 2. A number average molecular weight of the polyalkyleneimine that can be used to form the compound having the ammonium salt structure of the alkyl ester anion represented by Formula 1 can be, for example, equal to or greater than 200, and is preferably equal to or greater than 300, and more preferably equal to or greater than 400. In addition, the number average molecular weight of the polyalkyleneimine can be, for example, equal to or less than 10,000, and is preferably equal to or less than 5,000 and more preferably equal to or less than 2,000.

In the present invention and the present specification, the average molecular weight (weight-average molecular weight and number average molecular weight) is measured by gel permeation chromatography (GPC) and is a value obtained by performing standard polystyrene conversion. Unless otherwise noted, the average molecular weights shown in the examples which will be described below are values (polystyrene-equivalent values) obtained by standard polystyrene conversion of the values measured under the following measurement conditions using GPC.

GPC device: HLC-8220 (manufactured by Tosoh Corporation)

Guard Column: TSK guard column Super HZM-H

Column: TSK gel Super HZ 2000, TSK gel Super HZ 4000, TSK gel Super HZ-M (manufactured by Tosoh Corporation, 4.6 mm (inner diameter)×15.0 cm, three kinds of columns are linked in series)

Eluent: Tetrahydrofuran (THF), including stabilizer (2,6-di-t-butyl-4-methylphenol)

Eluent flow rate: 0.35 mL/min

Column temperature: 40° C.

inlet temperature: 40° C.

Refractive index (RI) measurement temperature: 40° C.

Sample concentration: 0.3% by mass

Sample injection amount: 10 μL

In addition, as the other embodiment of the nitrogen-containing polymer, polyallylamine can be used. The polyallylamine is a polymer of allylamine and is a polymer having a plurality of repeating units represented by Formula 3.

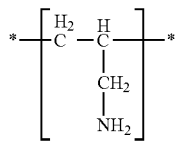

Formula 3

The nitrogen atom N configuring an amino group of a side chain in Formula 3 can be converted to a nitrogen cation $N^+$ to provide an ammonium cation represented by $Z^+$ in Formula 1. Then, an ammonium salt structure can be formed with the alkyl ester anion, for example, as follows.

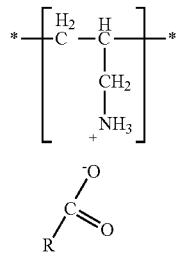

A weight-average molecular weight of the polyallylamine that can be used to form the compound having the ammonium salt structure of the alkyl ester anion represented by Formula 1 can be, for example, equal to or greater than 200, and is preferably equal to or greater than 1,000, and more preferably equal to or greater than 1,500. In addition, the weight-average molecular weight of the polyallylamine can be, for example, equal to or less than 15,000, and is preferably equal to or less than 10,000 and more preferably equal to or less than 8,000.

The fact that the compound having a structure derived from polyalkyleneimine or polyallylamine as the compound having the ammonium salt structure of the alkyl ester anion represented by Formula 1 is included in the magnetic layer can be confirmed by analyzing the surface of the magnetic layer by a time-of-flight secondary ion mass spectrometry (TOF-SIMS) or the like.

The compound having the ammonium salt structure of the alkyl ester anion represented by Formula 1 can be salt of a nitrogen-containing polymer and one or more fatty acids selected from the group consisting of fatty acids having 7 or more carbon atoms and fluorinated fatty acids having 7 or more carbon atoms. The nitrogen-containing polymer forming salt can be one kind or two or more kinds of nitrogen-containing polymers, and can be, for example, a nitrogen-containing polymer selected from the group consisting of polyalkyleneimines and polyallylamine. The fatty acids forming the salt can be one kind or two or more kinds of fatty acids selected from the group consisting of fatty acids having 7 or more carbon atoms and fluorinated fatty acids having 7 or more carbon atoms. The fluorinated fatty acid has a structure in which some or all of the hydrogen atoms configuring the alkyl group bonded to a carboxy group COOH in the fatty acid are substituted with fluorine atoms. For example, the salt forming reaction can easily proceed by mixing the nitrogen-containing polymer and the fatty acids described above at room temperature. The room temperature is, for example, approximately 20° C. to 25° C. In one embodiment, one or more kinds of nitrogen-containing polymers and one or more kinds of the fatty acids described above are used as components of the filler liquid, and the salt forming reaction can proceed by mixing these in the step of preparing the filler liquid. In one embodiment, one or more kinds of nitrogen-containing polymers and one or more kinds of the fatty acids described above are mixed to form a salt before preparing the filler liquid, and then, the filler liquid can be prepared using this salt as a component of the filler liquid. In a case where the nitrogen-containing polymer and the fatty acid are mixed to form an ammonium salt of the alkyl ester anion represented by Formula 1, the nitrogen atom configuring the nitrogen-containing polymer and the carboxy group of the fatty acid may be reacted to form the following structure, and a form including such a structure are also included in the above compound.

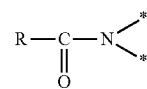

Examples of the fatty acids include fatty acids having an alkyl group described above as R in Formula 1 and fluorinated fatty acids having a fluorinated alkyl group described above as R in Formula 1.

A mixing ratio of the nitrogen-containing polymer and the fatty acid used to form the compound having the ammonium salt structure of the alkyl ester anion represented by Formula 1 is preferably 10:90 to 90:10, more preferably 20:80 to 85:15, and even more preferably 30:70 to 80:20, as a mass ratio of nitrogen-containing polymer:fatty acid. In addition, the used amount of the compound having the ammonium salt structure of the alkyl ester anion represented by Formula 1 is can be 1.0 to 20.0 parts by mass and is preferably 1.0 to 10.0 parts by mass with respect to 100.0 parts by mass of carbon black, during preparation of the filler liquid (for each filler liquid in a case of preparing a plurality of filler liquids).

In addition, for example, in a case of preparing the filler liquid (for each filler liquid in a case where preparing a plurality of filler liquids), 0.1 to 10.0 parts by mass of the nitrogen-containing polymer can be used and 0.5 to 8.0 parts by mass of the nitrogen-containing polymer is preferably used with respect to 100.0 parts by mass of carbon black. The used amount of the fatty acids described above can be, for example, 0.05 to 10.0 parts by mass and is preferably 0.1 to 5.0 parts by mass, with respect to 100.0 parts by mass of carbon black.

Non-Magnetic Layer

Next, the non-magnetic layer will be described. The magnetic recording medium may include a magnetic layer directly on a surface of the non-magnetic support or may include a magnetic layer on the surface of the non-magnetic support with a non-magnetic layer including a non-magnetic powder interposed therebetween. The non-magnetic powder used in the non-magnetic layer may be powder of an inorganic material or powder of an organic material. In addition, carbon black and the like can be used. Examples of the powder of the inorganic substance include powders of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black capable of being used in the non-magnetic layer, a description disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

The non-magnetic layer can include a binding agent and can also include additives. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support (hereinafter, also simply referred to as a "support") will be described.

As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic recording medium may or may not include a back coating layer including a non-magnetic powder on a surface of the non-magnetic support opposite to the surface provided with the magnetic layer. The back coating layer preferably includes any one or both of carbon black and inorganic powder. The back coating layer can include a binding agent and can also include additives. In regards to the binding agent included in the back coating layer and additives, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

Regarding a thickness (total thickness) of the magnetic recording medium, an increase in recording capacity (high capacity) of the magnetic recording medium is required in accordance with a great increase in information content in recent years. For example, regarding a tape-shaped magnetic recording medium (that is, a magnetic tape), as a unit for increasing the capacity, the thickness of the magnetic tape is decreased and a length of the magnetic tape accommodated in one roll of a magnetic tape cartridge is increased. From this point, the thickness (total thickness) of the magnetic recording medium is preferably equal to or less than 5.6 μm, more preferably equal to or less than 5.5 μm, even more preferably equal to or less than 5.4 μm, and still preferably equal to or less than 5.3 μm. From a viewpoint of ease of handling, the thickness of the magnetic recording medium is preferably equal to or greater than 3.0 μm and more preferably equal to or greater than 3.5 μm.

The thickness (total thickness) of the magnetic recording medium can be measured by the following method.

Ten samples (for example, 5 to 10 cm in length) are cut out from any portion of the magnetic recording medium, and the samples are stacked to measure the thickness. A value (thickness per sample) obtained by calculating 1/10 of the measured thickness is set as the total thickness. The thickness measurement can be performed using a well-known measuring device capable of measuring the thickness on the order of 0.1 μm.

A thickness of the non-magnetic support is preferably 3.0 to 5.0 μm.

A thickness of the magnetic layer can be optimized according to a saturation magnetization amount of a magnetic head used, a head gap length, a recording signal band, and the like, and is generally 0.01 μm to 0.15 μm, preferably 0.02 μm to 0.12 μm, and more preferably 0.03 μm to 0.1 μm, from a viewpoint of high-density recording. The magnetic layer may be at least one layer, or the magnetic layer can be separated to two or more layers having different magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.1 to 1.5 μm and preferably 0.1 to 1.0 μm.

A thickness of the back coating layer is preferably equal to or smaller than 0.9 μm and even more preferably 0.1 to 0.7 μm.

Various thicknesses such as the thickness of the magnetic layer and the like can be obtained by the following method.

A cross section of the magnetic recording medium in a thickness direction is exposed by ion beams, and the exposed cross section is observed with a scanning electron microscope. Various thicknesses can be obtained as an arithmetic average of thicknesses obtained at two random portions in cross-section observation. Alternatively, various thicknesses can also be obtained as a designed thickness calculated under the manufacturing conditions and the like.

Manufacturing Step

Preparation of Each Layer Forming Composition

A step of preparing the magnetic layer forming composition, the non-magnetic layer, or the back coating layer can generally include at least a kneading step, a dispersing step, and a mixing step provided before and after these steps, as necessary. Each step may be divided into two or more stages. Components used in the preparation of each layer forming composition may be added at the beginning or during any step. As the solvent, one kind or two or more kinds of various kinds of solvents usually used for producing a coating type magnetic recording medium can be used. For the solvent, descriptions disclosed in paragraph 0153 of JP2011-216149A can be referred to, for example. In addition, each component may be separately added in two or more steps. For example, the binding agent may be added separately in a kneading step, a dispersing step, and a mixing step for adjusting a viscosity after the dispersing. In order to manufacture the above magnetic recording medium, a well-known manufacturing technology of the related art can be used in various steps. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. As a disperser, a well-known disperser can be used. Filtration may be performed by a well-known method at any stage of preparing each layer forming composition. The filtering can be performed by using a filter, for example. As the filter used in the filtering, a filter having a hole diameter of 0.01 to 3 μm (for example, filter made of glass fiber or filter made of polypropylene) can be used, for example.

The abrasive solution is preferably prepared by dispersing separately from the ferromagnetic powder and the filler. The dispersion state of the abrasive in the abrasive solution can be adjusted by the presence or absence of a dispersing agent for improving the dispersibility of the abrasive, the amount of the dispersing agent used, the processing conditions of the dispersion process such as beads dispersion, and the classification treatment such as centrifugation. It is preferable to adjust the dispersion state of the abrasive to control the number distribution A. The abrasive solution is preferably prepared as one or more abrasive solutions containing an abrasive, a solvent, and preferably a binding agent, separately from the ferromagnetic powder and the filler, and can be used in the preparation of the magnetic layer forming composition. A commercially available device can be used for the dispersion process and the classification treatment. The conditions for performing these processes are not particularly limited, and may be set according to the type of the device used so that the number distribution A satisfies (1) to (3) described above.

In addition, the filler liquid is preferably prepared separately from the ferromagnetic powder and the abrasive. The dispersion state of the filler in the filler liquid can be adjusted by the presence or absence of a component for improving the dispersibility of the filler, the amount of the component used, the processing conditions of the dispersion process such as beads dispersion, and the classification treatment such as centrifugation. In one embodiment, one or more kinds of nitrogen-containing polymers and one or more kinds of the fatty acids described above are used as components of the filler liquid, and the salt forming reaction can proceed by mixing these in the step of preparing the filler liquid. In one embodiment, one or more kinds of nitrogen-containing polymers and one or more kinds of the fatty acids described above are mixed to form a salt before preparing the filler liquid, and then, the filler liquid can be prepared using this salt as a component of the filler liquid. It is preferable to adjust the dispersion state of the filler to control the number distribution B. The filler liquid is preferably prepared as one or more filler liquids containing a, a filler, a solvent, and preferably a binding agent, separately from the ferromagnetic powder and the abrasive, and can be used in the preparation of the magnetic layer forming composition. A commercially available device can be used for the stirring, dispersion process, and the classification treatment. The conditions for performing these processes are not particularly limited, and may be set according to the type of the device used so that the number distribution B satisfies (4) to (6) described above.

Regarding the dispersion process of the magnetic layer forming composition, in one embodiment, the dispersion process of the ferromagnetic powder is performed by the two-stage dispersion process. A coarse aggregate of the ferromagnetic powder is crushed by a first stage dispersion process. After that, a second stage dispersion process in which a collision energy applied to the particles of the ferromagnetic powder by the collision with the dispersion beads is smaller than that in the first dispersion process can be performed. It is considered that such dispersion process makes it possible to improve the dispersibility of the ferromagnetic powder and prevent the occurrence of chipping (partially lacking particles).

As an example of the two-stage dispersion process described above, a dispersion process including a first stage of obtaining a dispersion liquid by performing the dispersion process of a ferromagnetic powder, a binding agent, and a solvent in the presence of first dispersion beads, and a second stage of performing the dispersion process of a dispersion liquid obtained in the first stage in the presence of second dispersion beads having a bead diameter and a density smaller than those of the first dispersion beads. Hereinafter, the dispersion process described above will be in detail.

In order to improve the dispersibility of the ferromagnetic powder, it is preferable that the first stage and the second stage described above are performed as a dispersion process before mixing the ferromagnetic powder with other powder components. For example, it is preferable to perform the first stage and the second stage as the dispersion process of a liquid (magnetic liquid) containing a ferromagnetic powder, a binding agent, a solvent, and optionally added additives before mixing with an abrasive and a filler.

A bead diameter of the second dispersion beads is preferably $1/100$ or less or more preferably $1/500$ or less of a bead diameter of the first dispersion beads. In addition, the bead diameter of the second dispersion beads can be, for example, $1/10,000$ or more of the bead diameter of the first dispersion beads. However, there is no limitation to this range. For example, the bead diameter of the second dispersion beads is preferably in a range of 80 to 1,000 nm. Meanwhile, the bead diameter of the first dispersion beads can be, for example, in a range of 0.2 to 1.0 mm.

In the present invention and the present specification, the bead diameter is a value measured by the same method as the method for measuring the average particle size of powder described above.

The above second stage is preferably performed under the condition in which the second dispersion beads are present in an amount of 10 times or more the amount of the ferromagnetic hexagonal ferrite powder based on mass, and more preferably performed under the condition in which the amount is 10 to 30 times thereof.

Meanwhile, the amount of the first dispersion beads in the first stage is also preferably in the above range.

The second dispersion beads are beads having a density lower than that of the first dispersion beads. The "density" is obtained by dividing the mass (unit: g) of dispersion beads by the volume (unit: $cm^3$). The measurement is performed by the Archimedes method. The density of the second dispersion beads is preferably equal to or less than 3.7 $g/cm^3$ and more preferably equal to or less than 3.5 $g/cm^3$. The density of the second dispersion beads may be, for example, equal to or greater than 2.0 $g/cm^3$ or may be less than 2.0 $g/cm^3$. Examples of preferred second dispersion beads in terms of density include diamond beads, silicon carbide beads, silicon nitride beads, and the like, and examples of preferred second dispersion beads in terms of density and hardness include diamond beads.

On the other hand, the first dispersion beads are preferably dispersion beads having a density greater than 3.7 $g/cm^3$, more preferably dispersion beads having a density equal to or greater than 3.8 $g/cm^3$, and even more preferably dispersion beads having a density equal to or greater than 4.0 $g/cm^3$. The density of the first dispersion beads may be, for example, equal to or less than 7.0 g/cm; or may be greater than 7.0 $g/cm^3$. As the first dispersion beads, zirconia beads, alumina beads, and the like are preferably used, and zirconia beads are more preferably used.

The dispersion time is not particularly limited and may be set according to a type of a disperser used.

Coating Step

The magnetic layer can be formed, for example, by directly applying the magnetic layer forming composition onto the surface of the non-magnetic support or performing multilayer coating of the magnetic layer forming composition with the non-magnetic layer forming composition in order or at the same time. The back coating layer can be formed by applying a back coating layer forming composition onto a surface of the non-magnetic support opposite to the surface provided with the non-magnetic layer and/or the magnetic layer (or to be provided with the non-magnetic layer and/or magnetic layer). For details of the coating for forming each layer, a description disclosed in a paragraph 0066 of JP2010-231843A can be referred to.

Other Steps

For various other steps for manufacturing the magnetic recording medium, a well-known technology can be applied. For details of the various steps, descriptions disclosed in paragraphs 0067 to 0070 of JP2010-231843A can be referred to, for example. For example, the coating layer of the magnetic layer forming composition can be subjected to an alignment process in an alignment zone while the coating layer is wet. For the alignment process, various well-known technologies such as descriptions disclosed in a paragraph 0052 of JP2010-024113A can be used. For example, a homeotropic alignment process can be performed by a well-known method such as a method using a different polar opposing magnet. In the alignment zone, a drying speed of the coating layer can be controlled by a temperature, an air flow of the dry air and/or a transporting rate in the alignment zone. In addition, the coating layer may be preliminarily dried before transporting to the alignment zone. As an example, the magnetic field strength in a homeotropic alignment process can be 0.1 to 1.5 T. The magnetic recording medium can be a tape-shaped magnetic recording medium (magnetic tape), and may be a disk-shaped magnetic recording medium (magnetic disc). For example, regarding the magnetic tape, a long magnetic tape raw material can be obtained through various steps. The obtained magnetic tape raw material is cut (slit) by a well-known cutter to have a width of a magnetic tape to be wound and mounted on the magnetic tape cartridge. The width is determined according to the standard and is normally ½ inches. ½ inches=12.65 mm. A servo pattern is generally formed on the magnetic tape obtained by slitting. The servo pattern will be described later in detail. The magnetic tape is normally accommodated in a magnetic tape cartridge and the magnetic tape cartridge is mounted on a magnetic recording and reproducing device. In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic recording tape in order to record and/or reproduce data on the magnetic tape, the magnetic tape is drawn from the magnetic tape cartridge and wound around the reel on the magnetic tape unit side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the magnetic tape device side. In the meantime, the magnetic head comes into contact with and slides on the surface of the magnetic layer of the magnetic tape, and accordingly, the recording and/or reproduction of data is performed. With respect to this, in the twin reel type magnetic tape cartridge, both reels of the supply reel and the winding reel are provided in the magnetic tape cartridge.

Formation of Servo Pattern

A servo pattern can be formed on the magnetic recording medium by a well-known method, in order to realize tracking control of a magnetic head of the magnetic recording and reproducing device and control of a running speed of the magnetic recording medium. The "formation of the servo pattern" can be "recording of a servo signal". Hereinafter, the formation of the servo pattern will be described using a magnetic tape as an example.

The servo pattern is generally formed along a longitudinal direction of the magnetic tape. As a method of control using a servo signal (servo control), timing-based servo (TBS), amplitude servo, or frequency servo is used.

As shown in European Computer Manufacturers Association (ECMA)-319 (June 2001), a timing-based servo system is used in a magnetic tape based on a linear-tape-open (LTO) standard (generally referred to as an "LTO tape"). In this timing-based servo method, the servo pattern is configured by continuously disposing a plurality of pairs of magnetic stripes (also referred to as "servo stripes") not parallel to each other in a longitudinal direction of the magnetic tape. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In one embodiment, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 (June 2001) is used. In this staggered method, the group of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319 (June 2001), information showing the position in the longitudinal direction of the magnetic tape (also referred to as "Longitudinal Position (LPOS) information") is normally embedded in each servo band. This LPOS information is recorded so that the position of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo patterns to be formed. The width of each gap can be set as, for example, equal to or smaller than 1 µm, 1 to 10 µm, or equal to or greater than 10 µm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing becomes opposite to each other. Accordingly, the output of the servo signal obtained by the reading of the servo pattern can be increased. As disclosed in JP2012-053940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

In the magnetic recording and reproducing device, the recording of data on the magnetic recording medium and/or the reproducing of data recorded on the magnetic recording medium can be performed by bringing the surface of the magnetic layer of the magnetic recording medium into contact with the magnetic head and sliding.

For example, in a case of recording data on the magnetic recording medium in which the servo pattern is formed and/or reproducing the recorded data, first, the tracking is performed by using the servo signal obtained by reading the servo pattern. That is, as the servo signal reading element follows a predetermined servo track, the element for data is controlled to pass on the target data track. The movement of the data track is performed by changing the servo track to be read by the servo signal reading element in the tape width direction.

In addition, the recording and reproducing head can also perform the recording and/or reproducing with respect to other data bands. In this case, the servo signal reading element is moved to a predetermined servo band by using the UDIM information described above, and the tracking with respect to the servo band may be started.

In the magnetic recording and reproducing device, the recording of data on the magnetic recording medium can be performed at a high recording density. The magnetic recording and reproducing device can contribute to obtaining more excellent off-track margin properties in a case of reproducing data recorded at higher density. The recording density can be, for example, a linear recording density of equal to or greater than 400 kbpi (for example, in a range of 400 to 800 kbpi). The unit kbpi is a unit of linear recording density (cannot be converted to SI unit system).

EXAMPLES

Hereinafter, the invention will be described with reference to examples. However, the invention is not limited to embodiments shown in the examples. "Parts" and "%" in the following description mean "parts by mass" and "% by mass", unless otherwise noted. In addition, steps and evaluations described below are performed in an environment of an atmosphere temperature of 23° C.±1° C., unless otherwise noted. Further, "eq" is an equivalent which is a unit which cannot be converted into the SI unit.

Preparation of Abrasive Solution

Preparation of Abrasive Solution A

The amount of 2,3-dihydroxynaphthalene (manufactured by Tokyo Chemical Industry Co., Ltd.) shown in Table 1, 31.3 parts of a 32% solution (solvent is a mixed solvent of methyl ethyl ketone and toluene) of a containing polyester polyurethane resin having an $SO_3Na$ group as a polar group (UR-4800 (polar group amount: 80 meq/kg) manufactured by Toyobo Co., Ltd.), and 570.0 parts of a mixed solvent of methyl ethyl ketone and cyclohexanone (mass ratio of 1:1) as a solvent were mixed with respect to 100.0 parts of abrasive (alumina powder) shown in Table 1, and dispersed in the presence of zirconia beads (bead diameter: 0.1 mm) by a paint shaker for the time shown in Table 1.

After the dispersion, the dispersion liquid obtained by separating the dispersion liquid and the beads with a mesh was subjected to a centrifugal separation process. The centrifugation treatment was performed by using CS150GXL manufactured by Hitachi Koki Co., Ltd. (a rotor used is S100AT6 manufactured by Hitachi. Ltd.) as a centrifuge for the time (centrifugation time) shown in Table 1 at a rotation speed (rpm: rotation per minute) shown in Table 1. By this centrifugation treatment, particles having a comparatively large particle size are precipitated, and particles having a comparatively small particle size are dispersed in a supernatant.

Then, the supernatant was collected by decantation. This collected liquid is referred to as an "abrasive solution A".

Preparation of Abrasive Solutions B and C

An abrasive solution B and an abrasive solution C were prepared in the same manner as in the preparation of the abrasive solution A, except that various items were changed as shown in Table 1.

TABLE 1

|  |  | Abrasive solution A | Abrasive solution B | Abrasive solution C |
|---|---|---|---|---|
| Preparation of abrasive solution | Abrasive product name (manufactured by Sumitomo Chemical Co., Ltd.) | Hit80 | Hit70 | Hit70 |
|  | BET specific surface area of abrasive (m$^2$/g) | 30 | 20 | 20 |
|  | Content of abrasive solution dispersing agent (2,3-dihydroxynaphthalene) | 3.0 parts | 3.0 parts | None |
|  | Beads dispersion time | 360 min | 180 min | 60 min |
| Centrifugal separation | Rotation speed | 5500 rpm | 3500 rpm | 1000 rpm |
|  | Centrifugation time | 4 min | 4 min | 4 min |

Preparation of Filler Liquid D

The amount of polyethyleneimine shown in Table 2, the amount of stearic acid shown in Table 2, and 570.0 parts of a mixed solvent of methyl ethyl ketone and cyclohexanone (mass ratio of 1:1) as a solvent were mixed with respect to 100.0 parts of filler (carbon black) shown in Table 2, and dispersed in the presence of zirconia beads (bead diameter: 0.1 mm) by a paint shaker for the time shown in Table 2 (bead dispersion time).

After the dispersion, the dispersion liquid obtained by separating the dispersion liquid and the beads with a mesh was subjected to a centrifugal separation process. The centrifugation treatment was performed by using CS150GXL manufactured by Hitachi Koki Co., Ltd. (a rotor used is S100AT6 manufactured by Hitachi, Ltd.) as a centrifuge for the time (centrifugation time) shown in Table 2 at a rotation speed (rpm; rotation per minute) shown in Table 2. By this centrifugation treatment, particles having a comparatively large particle size are precipitated, and particles having a comparatively small particle size are dispersed in a supernatant.

Then, the supernatant was collected by decantation. This collected liquid is referred to as a "filler liquid D".

The polyethyleneimine is a commercially available product (number average molecular weight of 600) manufactured by Nippon Shokubai Co., Ltd.

Preparation of Filler Liquids E to G

Filler liquids E to G were prepared in the same manner as the preparation method of the filler liquid D, except that various items were changed as shown in Table 2.

TABLE 2

|  |  | Filler liquid D | Filler liquid E | Filler liquid F | Filler liquid G |
|---|---|---|---|---|---|
| Preparation of filler liquid | Filler product name (carbon black manufactured by Asahi Carbon Co., Ltd.) | ASAHI #50 | ASAHI #50 | ASAHI #50 | ASAHI #50 |

TABLE 2-continued

|  | Filler liquid D | Filler liquid E | Filler liquid F | Filler liquid G |
|---|---|---|---|---|
| BET specific surface area of filler (m²/g) | 23 | 23 | 23 | 23 |
| Polyethyleneimine | 1.0 part | 1.0 part | 1.0 part | None |
| Stearic acid | 2.0 parts | 2.0 parts | 2.0 parts | None |
| Beads dispersion time | 360 min | 60 min | 10 min | 180 min |
| Centrifugal separation Rotation speed | 5500 rpm | 3500 rpm | 1000 rpm | 5500 rpm |
| Centrifugation time | 4 min | 4 min | 4 min | 4 min |

Example 1

Preparation of Magnetic Layer Forming Composition
Magnetic liquid
Ferromagnetic powder: 100.0 parts
Hexagonal barium ferrite powder having an average particle size (average plate diameter) of 21 nm ("BaFe" in Table 3 (Table 3-1 to Table 3-2))
Oleic acid: 2.0 parts
Vinyl chloride copolymer (MR-104 manufactured by Zeon Corporation): 10.0 parts
$SO_3Na$ group-containing polyurethane resin: 4.0 parts
(weight average molecular weight: 70,000, $SO_3Na$ group: 0.07 meq/g)
Amine-based polymer (manufactured by BYK Chemie, DISPERBYK-102): 6.0 parts
Methyl ethyl ketone: 150.0 parts
Cyclohexanone: 150.0 parts
Abrasive solution
The abrasive solution shown in Table 3 are used so that the amount of the abrasive in the abrasive solution is the amount shown in Table 3
Filler liquid
The filler liquid shown in Table 3 is used so that the amount of the filler in the filler liquid is the amount shown in Table 3
Other components
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (Coronate (registered trademark) L manufactured by Tosoh Corporation): 3.0 parts
Preparation Method
A dispersion liquid A was prepared by dispersing (first stage) various components of the magnetic liquid described above with a batch type vertical sand mill by using zirconia heads having a bead diameter of 0.5 mm (first dispersion beads, density of 6.0 g/cm³) for 24 hours, and then performing filtering with a filter having a hole diameter of 0.5 μm. The zirconia beads were used in an amount of 10 times the mass of the ferromagnetic powder based on mass.
Then, the dispersion liquid A was dispersed by a batch type vertical sand mill for 1 hour using diamond beads having a bead diameter of 500 nm (second dispersion beads, density of 3.5 g/cm³) (second stage), and a dispersion liquid (dispersion liquid B) in which diamond beads were separated was prepared using a centrifugal separator. The diamond beads were used in an amount of 10 times the mass of the ferromagnetic powder based on mass.
The dispersion liquid B, the abrasive solution, the filler liquid, and the other components described above were introduced into a dissolver stirrer, and stirred at a peripheral speed of 10 m/sec for 360 minutes. Then, after performing ultrasonic dispersion process for 60 minutes with a flow type ultrasonic disperser at a flow rate of 7.5 kg/min, the magnetic layer forming composition was prepared by filtering three times with a filter having a hole diameter of 0.3 μm.

Preparation of Non-Magnetic Layer Forming Composition
A non-magnetic layer forming composition was prepared by dispersing various components of the non-magnetic layer forming composition described below with a batch type vertical sand mill by using zirconia beads having a bead diameter of 0.1 mm for 24 hours, and then performing filtering with a filter having a hole diameter of 0.5 μm.
Non-magnetic inorganic powder
α-iron oxide: 100.0 parts
(Average particle size: 10 nm, BET specific surface area: 75 m²/g) Carbon black: 25.0 parts
(Average particle size: 20 nm) $SO_3Na$ group-containing polyurethane resin: 18.0 parts
(Weight average molecular weight 70,000, $SO_3Na$ group content 0.2 meq/g)
Stearic acid: 1.0 part
Cyclohexanone: 300.0 parts
Methyl ethyl ketone: 300.0 parts Preparation of Back Coating Layer Forming Composition
Components except a lubricant (stearic acid and butyl stearate), polyisocyanate, and 200.0 parts of cyclohexanone among various components of the back coating layer forming composition were kneaded and diluted by an open kneader, and subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added and stirred with a dissolver, the obtained dispersion liquid was filtered with a filter having a hole diameter of μm and a back coating layer forming composition was prepared.
Non-Magnetic Inorganic Powder
α-iron oxide: 80.0 parts
(Average particle size: 0.15 μm, BET specific surface area: 52 m²/g)
Carbon black: 20.0 pans
Average particle size: 20 nm
Vinyl chloride copolymer: 13.0 parts
A sulfonic acid salt group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts Polyisocyanate: 5.0 parts
Cyclohexanone: 200.0 parts Manufacturing of Magnetic Tape The non-magnetic layer forming composition prepared in the section was applied to a surface of a support made of polyethylene naphthalate having a thickness of 4.2 μm so that the thickness after the drying becomes 0.7 μm and was dried to form a non-magnetic layer.

Then, the magnetic layer forming composition prepared as described above was applied onto the non-magnetic layer so that the thickness after the drying is 0.1 μm, and a coating layer was formed.

After that, a homeotropic alignment process was performed by applying a magnetic field having a magnetic field strength of 0.3 T in a vertical direction with respect to a surface of a coating layer, while the coating layer of the magnetic layer forming composition is wet. Then, the drying was performed to form the magnetic layer.

After that, the back coating layer forming composition prepared as described above was applied to the surface of the support made of polyethylene naphthalate on a side opposite to the surface where the non-magnetic layer and the magnetic layer were formed, so that the thickness after the drying becomes 0.3 μm, and was dried to form a back coating layer.

Then, a surface smoothing treatment (calender process) was performed by using a calender roll configured of only a metal roll, at a speed of 100 m/min, linear pressure of 300 kg/cm, and a calender temperature (surface temperature of a calender roll) of 90° C.

Then, after the heat treatment for 36 hours in an environment of an ambient temperature of 70° C., a long magnetic tape raw material was slit into a ½ inches width to obtain a magnetic tape. By recording a servo signal on the magnetic layer of the obtained magnetic tape by a commercially available servo writer, a magnetic tape having a servo pattern (timing-based servo pattern) in an arrangement according to the Linear Tape-Open (LTO) Ultrium format.

Evaluation of Off-Track Margin Properties
Recording Element and Reproducing Element The recording element was extracted from a commercially available magnetic head for an LTO drive, and the write gap side distal end of the first magnetic pole (leading side magnetic pole) was trimmed by ion milling. Accordingly, a recording element in which the distal end width W1 of the first magnetic pole was 3.0 μm and the distal end width W2 of the second magnetic pole (trailing side) was 3.0 μm was prepared. In Table 4 which will be described later, the recording element described as "trimming processing" in the "presence or absence of recording element trimming processing" is the recording element prepared as described above.

As the reproducing element, a TMR element having the reproducing element width shown in Table 4 (Table 4-1 to Table 4-2) was used.

Evaluation Method

In an environment with an ambient temperature of 23° C.±1° C. and a relative humidity of 50%, a magnetic tape was attached to a ½ inch reel tester to which a magnetic head comprising a recording element and a magnetic head comprising a reproducing element were fixed, and recording and reproduction of data were performed at a relative speed of 4 m/sec between the magnetic head and the magnetic tape in a case where performing the recording and reproduction. The recording was performed at a linear recording density of 600 kbpi, and the recording pattern used was a pseudo-random binary sequence of 63-bit and 127-bit periods.

Specifically, the recording was performed as follows. First, after recording a pseudo-random binary sequence with a 63-bit period on the first track, the magnetic head comprising the recording element was displaced by 1.0 μm in a tape width direction, and the pseudo-random binary sequence of 127-bit period was recorded as the second track so as to partially overwrite the first track.

Next, the bit error rate was obtained by arranging and reproducing the magnetic head comprising the reproducing element at the track center of the first track, and restoring the original recording sequence from the reproduction signal at the time of reproduction. Then, the magnetic head comprising the reproducing element was gradually moved in the tape width direction from the track center of the first track toward the second track, and the bit error rate of the reproduction signal at each reproduction position was evaluated. The bit error rate increased as the reproducing head was moved from the center of the first track toward the second track. A maximum distance between the reproducing head and the center of the first track that can ensure a bit error rate of $1 \times 10^{-4}$ or less was obtained as an "off-track margin". In a case where the off-track margin required as described above is equal to or greater than 100 nm, it can be evaluated that excellent off-track margin properties that can meet the more severe needs expected in the future with higher density recording have been obtained. In Table 4 which will be described later, "unevaluable" means that the magnetic tape was stuck to the magnetic head and thus could not run.

Examples 2 to 25 and Comparative Examples 1 to 33

A magnetic tape was manufactured and off-track margin properties were evaluated in the same manner as in Example 1, except that various items were changed as shown in the tables which will be described later. In Table 4, the recording element described as "None" in the "Presence or absence of recording element trimming" column is a recording element taken out from a magnetic head for a commercially available LTO drive, and was used for evaluation of the off-track margin properties without performing the trimming described above. The distal end width W1 of the first magnetic pole of this recording element is 41.0 μm, and the distal end width W2 of the second magnetic pole (trailing side) is 3.0 μm.

Example 26

A magnetic tape was manufactured and off-track margin properties were evaluated in the same manner as in Example 1, except that hexagonal strontium ferrite powder ("SrFe1" in Table 3) manufactured as described below was used as the ferromagnetic powder.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed in a mixer to obtain a raw material mixture.

The obtained raw material mixture was dissolved in a platinum crucible at a dissolving temperature of 1390° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roller to produce an amorphous body.

280 g of the prepared amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 mL of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 18 nm, an activation volume was 902 nm$^3$, an anisotropy constant Ku was 2.2×10$^5$ J/m$^3$, and a mass magnetization σs was 49 A·m$^2$/kg.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface layer portion content of the neodymium atom was 8.0 atom %. A ratio of the surface layer portion content and the bulk content, "surface layer portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the condition of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degrees Example 27

A magnetic tape was manufactured and off-track margin properties were evaluated in the same manner as in Example 1, except that hexagonal strontium ferrite powder ("SrFe2" in Table 3) manufactured as described below was used as the ferromagnetic powder.

1725 g of SrCO$_3$, 666 g of H$_3$BO$_3$, 1332 g of Fe$_2$O$_3$, 52 g of Al(OH)$_3$, 34 g of CaCO$_3$, and 141 g of BaCO$_3$ were weighed and mixed in a mixer to obtain a raw material mixture.

The obtained raw material mixture was dissolved in a platinum crucible at a dissolving temperature of 1380° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roll to prepare an amorphous body.

280 g of the obtained amorphous body was put into an electronic furnace, heated to 645° C. (crystallization temperature), and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 mL of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 19 nm, an activation volume was 1,102 nm$^3$, an anisotropy constant Ku was 2.0×10$^5$ J/m$^3$, and a mass magnetization σs was 50 A·m$^2$/kg.

Example 28

A magnetic tape was manufactured and off-track margin properties were evaluated in the same manner as in Example 1, except that ε-iron oxide powder ("ε-iron oxide" in Table 3) manufactured as described below was used as the ferromagnetic powder.

4.0 g of ammonia aqueous solution having a concentration of 25% was added to a material obtained by dissolving 8.3 g of iron (111) nitrate nonahydrate, 1.3 g of gallium (111) nitrate octahydrate, 190 mg of cobalt (II) nitrate hexahydrate, 150 mg of titanium (TV) sulfate, and 1.5 g of polyvinyl pyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid aqueous solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1000° C. was filled with the obtained precursor of ferromagnetic powder in the atmosphere and subjected to heat treatment for 4 hours.

The heat-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the thermal-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide ($\varepsilon\text{-}Ga_{0.28}Co_{0.05}Ti_{0.05}Fe_{1.62}O_3$) was obtained. In addition, the X-ray diffraction analysis was performed under the same conditions as disclosed regarding the hexagonal strontium ferrite powder SrFe1 described above, and it was confirmed that the obtained ferromagnetic powder has a crystal structure of a single phase which is an ε phase not including a crystal structure of an α phase and a γ phase (ε-iron oxide type crystal structure) from the peak of the X-ray diffraction pattern.

Regarding the obtained (ε-iron oxide powder, an average particle size was 12 nm, an activation volume was 746 $nm^3$, an anisotropy constant Ku was $1.2\times10$ $J/m^3$, and a mass magnetization σs was 16 $A\cdot m^2 l/kg$.

The activation volume and the anisotropy constant Ku of the hexagonal strontium ferrite powders and the ε-iron oxide powder are values obtained by the method described above regarding each ferromagnetic powder by using an oscillation sample type magnetic-flux meter (manufactured by Toei Industry Co., Ltd.).

The mass magnetization σs is a value measured using a oscillation sample type magnetic-flux meter (manufactured by Toei Industry Co., Ltd.) at a magnetic field strength of 1,194 kA/m (15 kOe).

TABLE 3

| | Ferromagnetic powder | Abrasive solution | | | Filler liquid | | | |
|---|---|---|---|---|---|---|---|---|
| | | A | B | C | D | E | F | G |
| Example 1 | BaFe | 6.0 parts | 2.5 parts | 20.0 parts | 0.6 parts | 0.8 parts | 0.3 parts | 0.0 parts |
| Example 2 | BaFe | 2.0 parts | 2.5 parts | 20.0 parts | 0.6 parts | 5.0 parts | 0.3 parts | 0.0 parts |
| Example 3 | BaFe | 6.0 parts | 2.5 parts | 20.0 parts | 0.0 parts | 5.0 parts | 0.3 parts | 0.0 parts |
| Example 4 | BaFe | 6.0 parts | 0.7 parts | 20.0 parts | 0.6 parts | 0.2 parts | 0.3 parts | 0.0 parts |
| Example 5 | BaFe | 6.0 parts | 2.5 parts | 6.7 parts | 0.0 parts | 0.2 parts | 0.3 parts | 0.0 parts |
| Example 6 | BaFe | 6.0 parts | 0.7 parts | 20.0 parts | 0.6 parts | 0.2 parts | 0.0 parts | 0.0 parts |
| Example 7 | BaFe | 6.0 parts | 0.7 parts | 6.7 parts | 0.6 parts | 5.0 parts | 0.0 parts | 0.0 parts |
| Example 8 | BaFe | 4.0 parts | 1.6 parts | 13.3 parts | 0.6 parts | 5.0 parts | 0.0 parts | 0.0 parts |
| Example 9 | BaFe | 6.0 parts | 2.5 parts | 6.7 parts | 0.3 parts | 2.0 parts | 0.1 parts | 0.0 parts |
| Example 10 | BaFe | 4.0 parts | 1.6 parts | 13.3 parts | 0.3 parts | 2.0 parts | 0.1 parts | 0.0 parts |
| Example 11 | BaFe | 4.0 parts | 0.7 parts | 13.3 parts | 0.0 parts | 2.0 parts | 0.1 parts | 0.0 parts |
| Example 12 | BaFe | 6.0 parts | 1.6 parts | 6.7 parts | 0.0 parts | 2.0 parts | 0.3 parts | 0.0 parts |
| Example 13 | BaFe | 2.0 parts | 2.5 parts | 20.0 parts | 0.0 parts | 0.2 parts | 0.3 parts | 0.0 parts |
| Example 14 | BaFe | 2.0 parts | 0.7 parts | 6.7 parts | 0.6 parts | 5.0 parts | 0.3 parts | 0.0 parts |
| Example 15 | BaFe | 6.0 parts | 2.5 parts | 20.0 parts | 0.0 parts | 0.2 parts | 0.0 parts | 0.0 parts |
| Example 16 | BaFe | 2.0 parts | 0.7 parts | 6.7 parts | 0.6 parts | 0.2 parts | 0.3 parts | 0.0 parts |
| Example 17 | BaFe | 6.0 parts | 0.7 parts | 20.0 parts | 0.0 parts | 0.2 parts | 0.0 parts | 0.0 parts |
| Example 18 | BaFe | 6.0 parts | 0.7 parts | 6.7 parts | 0.6 parts | 0.2 parts | 0.0 parts | 0.0 parts |
| Example 19 | BaFe | 2.0 parts | 0.7 parts | 20.0 parts | 0.0 parts | 0.0 parts | 0.0 parts | 0.0 parts |
| Example 20 | BaFe | 2.0 parts | 0.7 parts | 6.7 parts | 0.0 parts | 0.2 parts | 0.0 parts | 0.0 parts |
| Example 21 | BaFe | 2.0 parts | 0.7 parts | 6.7 parts | 0.0 parts | 0.2 parts | 0.0 parts | 0.0 parts |
| Example 22 | BaFe | 2.0 parts | 0.7 parts | 6.7 parts | 0.0 parts | 0.2 parts | 0.0 parts | 0.0 parts |
| Example 23 | BaFe | 2.0 parts | 0.7 parts | 6.7 parts | 0.0 parts | 0.2 parts | 0.0 parts | 0.0 parts |
| Example 24 | BaFe | 0.2 parts | 0.1 parts | 0.7 parts | 0.0 parts | 0.2 parts | 0.0 parts | 0.0 parts |
| Example 25 | BaFe | 6.0 parts | 2.5 parts | 46.7 parts | 0.6 parts | 5.0 parts | 0.3 parts | 0.0 parts |
| Example 26 | SrFe1 | 6.0 parts | 2.5 parts | 20.0 parts | 0.6 parts | 0.8 parts | 0.3 parts | 0.0 parts |
| Example 27 | SrFe2 | 6.0 parts | 2.5 parts | 20.0 parts | 0.6 parts | 0.8 parts | 0.3 parts | 0.0 parts |
| Example 28 | ε-iron oxide | 6.0 parts | 2.5 parts | 20.0 parts | 0.6 parts | 0.8 parts | 0.3 parts | 0.0 parts |
| Comparative Example 1 | BaFe | 1.6 parts | 3.0 parts | 1.0 part | 0.0 parts | 0.0 parts | 0.0 parts | 2.0 parts |
| Comparative Example 2 | BaFe | 0.0 parts | 0.0 parts | 0.0 parts | 0.0 parts | 0.0 parts | 0.0 parts | 0.0 parts |
| Comparative Example 3 | BaFe | 6.4 parts | 1.6 parts | 0.5 parts | 0.5 parts | 0.7 parts | 0.4 parts | 0.0 parts |
| Comparative Example 4 | BaFe | 4.0 parts | 1.6 parts | 5.0 parts | 0.5 parts | 0.7 parts | 0.4 parts | 0.0 parts |
| Comparative Example 5 | BaFe | 6.4 parts | 1.6 parts | 0.5 parts | 0.0 parts | 0.7 parts | 0.6 parts | 0.0 parts |
| Comparative Example 6 | BaFe | 6.4 parts | 1.6 parts | 2.0 parts | 0.0 parts | 0.0 parts | 0.0 parts | 2.4 parts |
| Comparative Example 7 | BaFe | 4.0 parts | 3.0 parts | 2.0 parts | 0.0 parts | 0.0 parts | 0.0 parts | 2.4 parts |
| Comparative Example 8 | BaFe | 4.0 parts | 3.0 parts | 5.0 parts | 0.0 parts | 0.0 parts | 0.0 parts | 2.4 parts |
| Comparative Example 9 | BaFe | 1.6 parts | 1.6 parts | 2.0 parts | 0.0 parts | 0.0 parts | 0.0 parts | 0.8 parts |
| Comparative Example 10 | BaFe | 6.4 parts | 0.5 parts | 2.0 parts | 0.0 parts | 0.0 parts | 0.0 parts | 0.3 parts |
| Comparative Example 11 | BaFe | 6.4 parts | 1.6 parts | 5.0 parts | 0.0 parts | 0.0 parts | 0.0 parts | 0.8 parts |

TABLE 3-continued

| | Ferromagnetic powder | Abrasive solution | | | Filler liquid | | | |
|---|---|---|---|---|---|---|---|---|
| | | A | B | C | D | E | F | G |
| Comparative Example 12 | BaFe | 4.0 parts | 0.5 parts | 2.0 parts | 0.0 parts | 0.0 parts | 0.0 parts | 2.4 parts |
| Comparative Example 13 | BaFe | 1.6 parts | 3.0 parts | 1.0 part | 0.0 parts | 0.0 parts | 0.0 parts | 2.0 parts |
| Comparative Example 14 | BaFe | 0.0 parts | 0.0 parts | 0.0 parts | 0.0 parts | 0.0 parts | 0.0 parts | 0.0 parts |
| Comparative Example 15 | BaFe | 6.4 parts | 1.6 parts | 0.5 parts | 0.5 parts | 0.7 parts | 0.4 parts | 0.0 parts |
| Comparative Example 16 | BaFe | 4.0 parts | 1.6 parts | 5.0 parts | 0.5 parts | 0.7 parts | 0.4 parts | 0.0 parts |
| Comparative Example 17 | BaFe | 6.4 parts | 1.6 parts | 0.5 parts | 0.0 parts | 0.7 parts | 0.6 parts | 0.0 parts |
| Comparative Example 18 | BaFe | 6.4 parts | 1.6 parts | 2.0 parts | 0.0 parts | 0.0 parts | 0.0 parts | 2.4 parts |
| Comparative Example 19 | BaFe | 4.0 parts | 3.0 parts | 2.0 parts | 0.0 parts | 0.0 parts | 0.0 parts | 2.4 parts |
| Comparative Example 20 | BaFe | 4.0 parts | 3.0 parts | 5.0 parts | 0.0 parts | 0.0 parts | 0.0 parts | 2.4 parts |
| Comparative Example 21 | BaFe | 1.6 parts | 1.6 parts | 2.0 parts | 0.0 parts | 0.0 parts | 0.0 parts | 0.8 parts |
| Comparative Example 22 | BaFe | 6.4 parts | 0.5 parts | 2.0 parts | 0.0 parts | 0.0 parts | 0.0 parts | 0.8 parts |
| Comparative Example 23 | BaFe | 6.4 parts | 1.6 parts | 5.0 parts | 0.0 parts | 0.0 parts | 0.0 parts | 0.8 parts |
| Comparative Example 24 | BaFe | 4.0 parts | 0.5 parts | 2.0 parts | 0.0 parts | 0.0 parts | 0.0 parts | 2.4 parts |
| Comparative Example 25 | BaFe | 4.0 parts | 0.5 parts | 2.0 parts | 0.0 parts | 0.0 parts | 0.0 parts | 2.4 parts |
| Comparative Example 26 | BaFe | 4.0 parts | 0.5 parts | 2.0 parts | 0.0 parts | 0.0 parts | 0.0 parts | 2.4 parts |
| Comparative Example 27 | BaFe | 2.0 parts | 0.7 parts | 20.0 parts | 0.0 parts | 0.0 parts | 0.0 parts | 0.0 parts |
| Comparative Example 28 | BaFe | 2.0 parts | 0.7 parts | 6.7 parts | 0.0 parts | 0.2 parts | 0.0 parts | 0.0 parts |
| Comparative Example 29 | BaFe | 2.0 parts | 0.7 parts | 6.7 parts | 0.0 parts | 0.2 parts | 0.0 parts | 0.0 parts |
| Comparative Example 30 | BaFe | 2.0 parts | 0.7 parts | 6.7 parts | 0.0 parts | 0.2 parts | 0.0 parts | 0.0 parts |
| Comparative Example 31 | BaFe | 2.0 parts | 0.7 parts | 6.7 parts | 0.0 parts | 0.2 parts | 0.0 parts | 0.0 parts |
| Comparative Example 32 | BaFe | 0.2 parts | 0.1 parts | 0.7 parts | 0.0 parts | 0.2 parts | 0.0 parts | 0.0 parts |
| Comparative Example 33 | BaFe | 6.0 parts | 2.5 parts | 46.7 parts | 0.6 parts | 5.0 parts | 0.3 parts | 0.0 parts |

Evaluation of Physical Properties of Magnetic Tape

The physical properties of the magnetic tapes of the examples and comparative examples were evaluated by the following methods.

Number Distribution A and Number Distribution B

Using a FE-SEM S4800 manufactured by Hitachi, Ltd. as a scanning electron microscope (FE-SEM) the number distribution A and the number distribution B of the magnetic layer surface of each magnetic tape were obtained by the following method.

Number Distribution A

A secondary electron image of the surface of the magnetic layer of the magnetic recording medium to be measured is imaged using a scanning electron microscope (FE-SEM). As imaging conditions, an acceleration voltage is set as 5 kV, a working distance is set as 5 mm, and an imaging magnification ratio is set as 10,000 times. At the time of imaging, a non-imaging region on the surface of the magnetic layer is selected, focus adjustment is performed under the above imaging conditions, and a secondary electron image is captured. A portion (micron bar, cross mark, or the like) for displaying a size and the like is removed from the captured image, and a secondary electron image having a pixel number of 960 pixels×1280 pixels is obtained.

The above operation is performed 100 times at different portions on the surface of the magnetic layer of the magnetic recording medium to be measured.

The secondary electron image obtained as described above is loaded into image processing software (ImageJ of free software, and binarization processing is performed by the following procedure.

A threshold value for binarizing the secondary electron image obtained above has a lower limit value of 210 gradations and an upper limit value of 255 gradations, and the binarization processing is executed with these two threshold values. After the binarization processing, in the image analysis software (ImageJ of free software), the noise cut process Despeckle is selected to remove the noise component.

For the binarized image obtained as described above, the number of bright areas (that is, white portions) and the area of each bright area are obtained by image analysis software (ImageJ of free software). From the area A of the bright area obtained here, the equivalent circle diameter L of each bright area is calculated by $(A/\pi)^{(1/2)} \times 2 = L$.

The above steps are performed on the binarized images (100 images) obtained above.

By doing so, the number distribution A is obtained.

Number Distribution B

A secondary electron image of the surface of the magnetic layer of the magnetic recording medium to be measured is imaged using a scanning electron microscope (FE-SEM). As imaging conditions, an acceleration voltage is set as 2 kV, a working distance is set as 5 mm, and an imaging magnification ratio is set as 10,000 times. At the time of imaging, a non-imaging region on the surface of the magnetic layer is selected, focus adjustment is performed under the above imaging conditions, and a secondary electron image is captured. A portion (micron bar, cross mark, or the like) for displaying a size and the like is removed from the captured image, and a secondary electron image having a pixel number of 960 pixels×1280 pixels is obtained.

The above operation is performed 100 times at different portions on the surface of the magnetic layer of the magnetic recording medium to be measured.

The secondary electron image obtained as described above is loaded into image processing software (ImageJ of free software, and binarization processing is performed by the following procedure.

A threshold value for binarizing the secondary electron image obtained above has a lower limit value of 0 gradations and an upper limit value of 75 gradations, and the binarization processing is executed with these two threshold values. After the binarization processing, in the image analysis software (ImageJ of free software), the noise cut process Despeckle is selected to remove the noise component.

For the binarized image obtained as described above, the number of dark areas (that is, black portions) and the area of each dark area are obtained by image analysis software (ImageJ of free software). From the area A of the dark area obtained here, the equivalent circle diameter L of each dark area is calculated by $(A/\pi)^{(1/2)} \times 2 = L$.

The above steps are performed on the binarized images (100 images) obtained above.

By doing so, the number distribution B is obtained.

Total thickness of Magnetic Tape (Tape Thickness)

Ten tape samples (for example, 5 cm in length) are cut out from any portion of the magnetic tape, and the tape samples are stacked to measure the thickness. The thickness was measured using a digital thickness gauge of a Millimar 1240 compact amplifier manufactured by MARH and a Millimar 1301 induction probe. A value (thickness per tape sample) obtained by calculating 1/10 of the measured thickness was set as the thickness of the tape. For each magnetic tape, the tape thickness was 5.3 μm.

TABLE 4

| | Number distribution A | | | Number distribution B | | | | Reproducing element width (μm) | Off-track margin (nm) |
|---|---|---|---|---|---|---|---|---|---|
| | 1 nm to 50 nm | 51 nm to 100 nm | Equal to or greater than 101 | 1 nm to 50 nm | 51 nm to 100 nm | Equal to or greater than 101 | Recording element Trimming or not | | |
| Example 1 | 30000 | 25000 | 3000 | 25000 | 5000 | 200 | Trimming performed | 0.8 | 100 |
| Example 2 | 10000 | 25000 | 3000 | 25000 | 5000 | 200 | Trimming performed | 0.8 | 100 |
| Example 3 | 30000 | 25000 | 3000 | 1000 | 5000 | 200 | Trimming performed | 0.8 | 100 |
| Example 4 | 30000 | 7000 | 3000 | 25000 | 200 | 200 | Trimming performed | 0.8 | 100 |
| Example 5 | 30000 | 25000 | 1000 | 1000 | 200 | 200 | Trimming performed | 0.8 | 150 |
| Example 6 | 30000 | 7000 | 3000 | 25000 | 200 | 0 | Trimming performed | 0.8 | 150 |
| Example 7 | 30000 | 7000 | 1000 | 25000 | 5000 | 0 | Trimming performed | 0.8 | 200 |
| Example 8 | 20000 | 16000 | 2000 | 25000 | 5000 | 0 | Trimming performed | 0.8 | 150 |
| Example 9 | 30000 | 25000 | 1000 | 10000 | 2000 | 100 | Trimming performed | 0.8 | 150 |
| Example 10 | 20000 | 16000 | 2000 | 10000 | 2000 | 100 | Trimming performed | 0.8 | 150 |
| Example 11 | 20000 | 7000 | 2000 | 1000 | 200 | 100 | Trimming performed | 0.8 | 150 |
| Example 12 | 30000 | 16000 | 1000 | 1000 | 2000 | 200 | Trimming performed | 0.8 | 150 |
| Example 13 | 10000 | 25000 | 3000 | 1000 | 200 | 200 | Trimming performed | 0.8 | 100 |
| Example 14 | 10000 | 7000 | 1000 | 25000 | 5000 | 200 | Trimming performed | 0.8 | 150 |
| Example 15 | 30000 | 25000 | 3000 | 1000 | 200 | 0 | Trimming performed | 0.8 | 100 |
| Example 16 | 10000 | 7000 | 1000 | 25000 | 200 | 200 | Trimming performed | 0.8 | 150 |
| Example 17 | 30000 | 7000 | 3000 | 1000 | 200 | 0 | Trimming performed | 0.8 | 150 |
| Example 18 | 30000 | 7000 | 1000 | 25000 | 200 | 0 | Trimming performed | 0.8 | 150 |
| Example 19 | 10000 | 7000 | 3000 | 1000 | 200 | 200 | Trimming performed | 0.8 | 100 |
| Example 20 | 10000 | 7000 | 1000 | 1000 | 200 | 0 | Trimming performed | 0.8 | 150 |
| Example 21 | 10000 | 7000 | 1000 | 1000 | 200 | 0 | Trimming performed | 0.6 | 200 |
| Example 22 | 10000 | 7000 | 1000 | 1000 | 200 | 0 | Trimming performed | 0.5 | 250 |
| Example 23 | 10000 | 7000 | 1000 | 1000 | 200 | 0 | Trimming performed | 0.2 | 400 |
| Example 24 | 1000 | 1000 | 100 | 10 | 200 | 0 | Trimming performed | 0.8 | 250 |
| Example 25 | 30000 | 25000 | 7000 | 25000 | 5000 | 200 | Trimming performed | 0.8 | 100 |
| Example 26 | 30000 | 25000 | 3000 | 25000 | 5000 | 200 | Trimming performed | 0.8 | 100 |
| Example 27 | 30000 | 25000 | 3000 | 25000 | 5000 | 200 | Trimming performed | 0.8 | 100 |
| Example 28 | 30000 | 25000 | 3000 | 25000 | 5000 | 200 | Trimming performed | 0.8 | 100 |
| Comparative Example 1 | 8000 | 30000 | 1000 | 0 | 7000 | 200 | Not performed | 1.0 | 0 |
| Comparative Example 2 | 0 | 0 | 0 | 0 | 0 | 0 | Not performed | 1.0 | Not evaluable |
| Comparative Example 3 | 32000 | 16000 | 500 | 10000 | 2000 | 280 | Not performed | 1.0 | 0 |
| Comparative Example 4 | 20000 | 16000 | 5000 | 10000 | 2000 | 280 | Not performed | 1.0 | 0 |
| Comparative Example 5 | 32000 | 16000 | 500 | 600 | 2000 | 450 | Not performed | 1.0 | 0 |
| Comparative Example 6 | 32000 | 16000 | 2000 | 0 | 7000 | 240 | Not performed | 1.0 | 0 |
| Comparative Example 7 | 20000 | 30000 | 2000 | 0 | 7000 | 240 | Not performed | 1.0 | 0 |
| Comparative Example 8 | 20000 | 30000 | 5000 | 0 | 7000 | 240 | Not performed | 1.0 | 0 |
| Comparative Example 9 | 8000 | 16000 | 2000 | 0 | 2000 | 80 | Not performed | 1.0 | 0 |
| Comparative Example 10 | 32000 | 5000 | 2000 | 0 | 2000 | 80 | Not performed | 1.0 | 0 |
| Comparative Example 11 | 32000 | 16000 | 5000 | 0 | 2000 | 80 | Not performed | 1.0 | 0 |
| Comparative Example 12 | 20000 | 5000 | 2000 | 0 | 7000 | 240 | Not performed | 1.0 | 0 |
| Comparative Example 13 | 8000 | 30000 | 1000 | 0 | 7000 | 200 | Trimming performed | 1.0 | 30 |
| Comparative Example 14 | 0 | 0 | 0 | 0 | 0 | 0 | Trimming performed | 0.8 | |
| Comparative Example 15 | 32000 | 16000 | 500 | 10000 | 2000 | 280 | Trimming performed | 0.8 | 30 |
| Comparative Example 16 | 20000 | 16000 | 5000 | 10000 | 2000 | 280 | Trimming performed | 0.8 | 30 |
| Comparative Example 17 | 32000 | 16000 | 500 | 600 | 2000 | 450 | Trimming performed | 0.8 | 30 |
| Comparative Example 18 | 32000 | 16000 | 2000 | 0 | 7000 | 240 | Trimming performed | 0.8 | 30 |
| Comparative Example 19 | 20000 | 30000 | 2000 | 0 | 7000 | 240 | Trimming performed | 0.8 | 30 |
| Comparative Example 20 | 20000 | 30000 | 5000 | 0 | 7000 | 240 | Trimming performed | 0.8 | 30 |
| Comparative Example 21 | 8000 | 16000 | 2000 | 0 | 2000 | 80 | Trimming performed | 0.8 | 30 |
| Comparative Example 22 | 32000 | 5000 | 2000 | 0 | 2000 | 80 | Trimming performed | 0.8 | 30 |
| Comparative Example 23 | 32000 | 16000 | 5000 | 0 | 2000 | 80 | Trimming performed | 0.8 | 30 |
| Comparative Example 24 | 20000 | 5000 | 2000 | 0 | 7000 | 240 | Trimming performed | 0.8 | 30 |
| Comparative Example 25 | 20000 | 5000 | 2000 | 0 | 7000 | 240 | Trimming performed | 0.5 | 40 |
| Comparative Example 26 | 20000 | 5000 | 2000 | 0 | 7000 | 240 | Trimming performed | 0.2 | 50 |
| Comparative Example 27 | 10000 | 7000 | 3000 | 1000 | 200 | 200 | Trimming performed | 0.8 | 30 |
| Comparative Example 28 | 10000 | 7000 | 1000 | 1000 | 200 | 0 | Not performed | 0.8 | 30 |
| Comparative Example 29 | 10000 | 7000 | 1000 | 1000 | 200 | 0 | Not performed | 0.8 | 30 |
| Comparative Example 30 | 10000 | 7000 | 1000 | 1000 | 200 | 0 | Not performed | 0.8 | 30 |
| Comparative Example 31 | 10000 | 7000 | 1000 | 1000 | 200 | 0 | Not performed | 0.8 | 30 |
| Comparative Example 32 | 1000 | 1000 | 100 | 10 | 200 | 0 | Not performed | 0.8 | 30 |
| Comparative Example 33 | 30000 | 25000 | 7000 | 25000 | 5000 | 200 | Not performed | 0.8 | 30 |

One embodiment of the present invention is useful in the technical field of magnetic recording media for high density recording.

What is claimed is:

1. A magnetic recording and reproducing device comprising:
    a magnetic recording medium;
    a recording element; and
    a reproducing element;
    wherein the recording element is an inductive recording element including
    a first magnetic pole which generates a magnetic field, and
    a second magnetic pole which is separated from the first magnetic pole with a write gap interposed therebetween,
    a distal end width of the first magnetic pole is substantially the same as a distal end width of the second magnetic pole,
    a reproducing element width of the reproducing element is equal to or less than 0.8 µm,
    the magnetic recording medium includes
    a non-magnetic support, and a magnetic layer including a ferromagnetic powder,
    a number distribution A of equivalent circle diameters of a plurality of bright areas in a binarized image of a secondary electron image obtained by imaging a surface of the magnetic layer with a scanning electron microscope at an acceleration voltage of 5 kV satisfies the following (1) to (3):
    (1) the number of bright areas having an equivalent circle diameter of 1 nm to 50 nm is 1,000 to 30,000,
    (2) the number of bright areas having an equivalent circle diameter of 51 nm to 100 nm is 1,000 to 25,000, and
    (3) the number of bright areas having an equivalent circle diameter equal to or greater than 101 nm is 100 to 7,000, and
    a number distribution B of equivalent circle diameters of a plurality of dark areas in a binarized image of a secondary electron image obtained by imaging the surface of the magnetic layer with a scanning electron microscope at an acceleration voltage of 2 kV satisfies the following (4) to (6):
    (4) the number of dark areas having an equivalent circle diameter of 1 nm to 50 nm is 10 to 25,000,
    (5) the number of dark areas having an equivalent circle diameter of 51 nm to 100 nm is 200 to 5,000, and
    (6) the number of dark areas having an equivalent circle diameter equal to or greater than 101 nm is 0 to 200.

2. The magnetic recording and reproducing device according to claim 1,
    wherein a total thickness of the magnetic recording medium is equal to or less than 5.3 µm.

3. The magnetic recording and reproducing device according to claim 1,
    wherein the magnetic recording medium includes a non-magnetic layer including a non-magnetic powder between the non-magnetic support and the magnetic layer.

4. The magnetic recording and reproducing device according to claim 1,
    wherein the magnetic recording medium includes a back coating layer including a non-magnetic powder on a surface of the non-magnetic support opposite to a surface provided with the magnetic layer.

5. The magnetic recording and reproducing device according to claim 1,
    wherein the magnetic layer includes two or more kinds of non-magnetic powder.

6. The magnetic recording and reproducing device according to claim 5,
    wherein the non-magnetic powder of the magnetic layer includes an alumina powder.

7. The magnetic recording and reproducing device according to claim 5,
    wherein the non-magnetic powder of the magnetic layer includes carbon black.

8. The magnetic recording and reproducing device according to claim 1,
    wherein the ferromagnetic powder is a hexagonal barium ferrite powder.

9. The magnetic recording and reproducing device according to claim 1,
    wherein the ferromagnetic powder is a hexagonal strontium ferrite powder.

10. The magnetic recording and reproducing device according to claim 1,
    wherein the ferromagnetic powder is an ε-iron oxide powder.

11. The magnetic recording and reproducing device according to claim 1,
    wherein the magnetic recording medium is a magnetic tape.

* * * * *